US011241002B2

(12) United States Patent
Jay

(10) Patent No.: US 11,241,002 B2
(45) Date of Patent: Feb. 8, 2022

(54) REMOTE INSECT MONITORING SYSTEMS AND METHODS

(71) Applicant: Matthew Jay, Basalt, CO (US)

(72) Inventor: Matthew Jay, Basalt, CO (US)

(*) Notice: Subject to any disclaimer, the term of this patent is extended or adjusted under 35 U.S.C. 154(b) by 138 days.

(21) Appl. No.: 15/430,207

(22) Filed: Feb. 10, 2017

(65) Prior Publication Data

US 2017/0273290 A1 Sep. 28, 2017

Related U.S. Application Data

(60) Provisional application No. 62/311,779, filed on Mar. 22, 2016.

(51) Int. Cl.
*A01M 1/02* (2006.01)
*G06K 9/00* (2006.01)
(Continued)

(52) U.S. Cl.
CPC ............ *A01M 1/026* (2013.01); *A01M 1/023* (2013.01); *A01M 1/04* (2013.01); *A01M 1/106* (2013.01); *G06K 9/00771* (2013.01); *G06T 7/0012* (2013.01); *G06T 2207/10004* (2013.01); *G06T 2207/10048* (2013.01); *G06T 2207/30004* (2013.01); *G06T 2207/30242* (2013.01)

(58) Field of Classification Search
CPC ........ A01M 1/02; A01M 1/023; A01M 1/026; A01M 1/106; A01M 1/04; A01K 29/00; A01K 29/005
USPC .................................................. 43/107, 111
See application file for complete search history.

(56) References Cited

U.S. PATENT DOCUMENTS 4,410,967 A * 10/1983 Hendricks ............... G01S 15/88
367/108
4,671,435 A * 6/1987 Stout .................... A01M 1/2044
222/646
(Continued)

FOREIGN PATENT DOCUMENTS

CA 2814940 C * 1/2019 ............ A01M 1/023
CN 102393920 3/2012
(Continued)

OTHER PUBLICATIONS

International Patent Application No. PCT/US17/23588; International Search Report and Written Opinion dated Aug. 29, 2017; 18 pgs.
(Continued)

*Primary Examiner* — Lisa L Tsang
(74) *Attorney, Agent, or Firm* — Lathrop GPM LLP

(57) ABSTRACT

A remote insect monitor and associated method include a container configured to allow an insect attractant within the container to escape into ambient air proximate a landing area. At least one detection sensor generating sensor data of insects proximate the landing area, and a control module has a processor and a memory storing machine readable instructions executable by the processor to process the sensor data and count insects proximate the landing area. The remote insect monitor and associated method may also include an analyzer for analyzing an insect of interest to determine whether the insect carries a disease, wherein the control module sends an indication of whether the insect carries the disease to the remote server.

18 Claims, 14 Drawing Sheets

(51) Int. Cl.
*A01M 1/04* (2006.01)
*A01M 1/10* (2006.01)
*G06T 7/00* (2017.01)

(56) References Cited

U.S. PATENT DOCUMENTS

| | | | | |
|---|---|---|---|---|
| 5,335,446 A * | 8/1994 | Shigetoyo | ............ | A01M 1/2033 43/125 |
| 5,367,821 A * | 11/1994 | Ott | ............ | A01M 1/06 43/134 |
| 6,055,766 A * | 5/2000 | Nolen | ............ | A01M 1/023 43/112 |
| 6,568,125 B2 * | 5/2003 | Kleinhenz | ............ | A01M 1/023 43/107 |
| 6,598,337 B2 * | 7/2003 | Ogram | ............ | A01K 57/00 222/3 |
| 7,509,770 B2 * | 3/2009 | Gardner, Jr. | ............ | A01M 1/026 43/107 |
| 7,921,594 B2 * | 4/2011 | Ropiak | ............ | A01M 1/023 43/107 |
| 8,365,995 B2 * | 2/2013 | Jiang | ............ | G06M 11/00 235/385 |
| 8,893,428 B2 * | 11/2014 | Dykstra | ............ | A01M 1/02 250/526 |
| 10,314,299 B2 * | 6/2019 | Ikawa | ............ | F24V 30/00 |
| 2004/0093190 A1 * | 5/2004 | Beroza | ............ | A01M 1/026 702/189 |
| 2004/0139648 A1 * | 7/2004 | Durand | ............ | A01M 1/023 43/139 |
| 2005/0210735 A1 | 9/2005 | Harmer | | |
| 2006/0130391 A1 * | 6/2006 | Livingston | ............ | A01M 29/12 43/124 |
| 2006/0260183 A1 | 11/2006 | Hockaday | | |
| 2007/0157508 A1 * | 7/2007 | Chang | ............ | A01M 1/023 43/139 |
| 2007/0193109 A1 | 8/2007 | Chyun et al. | | |
| 2008/0148624 A1 * | 6/2008 | Borth | ............ | G01N 33/68 43/131 |
| 2008/0181352 A1 * | 7/2008 | Hirafuji | ............ | A01M 1/026 377/16 |
| 2009/0126257 A1 | 5/2009 | Banfield | | |
| 2009/0223115 A1 | 9/2009 | Lang et al. | | |
| 2010/0134301 A1 * | 6/2010 | Borth | ............ | A01M 1/026 340/573.2 |
| 2012/0291337 A1 | 11/2012 | Curcio | | |
| 2013/0111802 A1 | 5/2013 | Oehlschlager | | |
| 2013/0162443 A1 * | 6/2013 | Oppenheimer | ............ | A01M 1/106 340/870.03 |
| 2013/0204581 A1 | 8/2013 | Park et al. | | |
| 2014/0130399 A1 * | 5/2014 | Halahmi | ............ | A01M 1/2005 43/131 |
| 2014/0226860 A1 * | 8/2014 | Hyde | ............ | A01M 1/026 382/103 |
| 2014/0283435 A1 * | 9/2014 | Galeb | ............ | A01M 23/005 43/107 |
| 2015/0216158 A1 * | 8/2015 | Mizrach | ............ | A01M 1/2016 43/107 |
| 2015/0366169 A1 * | 12/2015 | Jiang | ............ | A01K 55/00 449/20 |
| 2016/0270378 A1 * | 9/2016 | Chen | ............ | A01K 67/033 |
| 2018/0279598 A1 * | 10/2018 | Hur | ............ | A01M 1/023 |

FOREIGN PATENT DOCUMENTS

| | | | | |
|---|---|---|---|---|
| CN | 105124868 | | 12/2015 | |
| EP | 2149301 A1 * | | 2/2010 | ............ A01M 1/026 |
| EP | 2387306 B1 * | | 11/2019 | ............ A01M 1/103 |
| KR | 20140093346 | | 7/2014 | |
| WO | WO-2006101654 A2 * | | 9/2006 | ............ A01M 1/026 |

OTHER PUBLICATIONS http://www.wumcd.org/surveillance/landingrates.html, West Umatilla, accessed Feb. 11, 2016.

* cited by examiner

REMOTE INSECT MONITORING SYSTEMS AND METHODS

RELATED APPLICATIONS

This application claims priority to U.S. Patent Application Ser. No. 62/311,779, titled "Remote Insect Monitoring System," filed Mar. 22, 2016, and incorporated herein by reference in its entirety.

BACKGROUND

Insects such as mosquitos transmit infectious disease carrying agents. Efforts to control insect populations rely on identifying and monitoring those populations at multiple locations. One method for monitoring mosquito populations is to measure a mosquito landing rate on a person's forearm. This method involves a person rolling up his or her sleeve to expose a forearm and counting the number of mosquitos that land on the exposed forearm over a predetermined duration. This creates logistic difficulties of having a person in each location to count insects.

Where insect traps are set for a period of time, information regarding the insects is not available until the trap has been collected and the insects manually analyzed. Where the trap has captured thousands of insects, the manual analysis takes a long time, particularly where a particular insect species or sub-species is sought amongst the captured insects and where that particular insect was not captured, the traps must be set again.

SUMMARY

In an embodiment, a remote insect monitor includes a container configured to allow an insect attractant within the container to escape into ambient air proximate a landing area. At least one detection sensor generates sensor data of insects proximate the landing area. A control module has a processor and a memory storing machine readable instructions executable by the processor to process the sensor data and count insects proximate the landing area.

In another embodiment, a method remotely detects insects. An insect attractant is released into ambient air proximate a landing area and sensor data of insects proximate the landing area is captured from a sensor proximate the landing area. The sensor data is processed to count the insects and the count is sent to a remote server.

In another embodiment, a method detects spread of a disease by insects. An insect attractant is released into ambient air proximate a landing area. At least one insect of interest proximate the landing area is captured. The insect of interest is analyzed to detect presence of the disease, and an indication of detected presence of the disease is sent to a remote server.

In another embodiment, an insect monitoring and analyzing system detects a disease carried by an insect of interest. The system has a container configured to release an insect attractant within the container to ambient air to attract insects to a landing area, at least one detection sensor for identifying the insect of interest proximate the landing area, an analyzer for analyzing the insect of interest to detect the presence of the disease, a communication module and a control module with a processor and a memory storing machine readable instructions executable by the processor to control the at least one detection sensor and the analyzer to determine whether the disease is carried by the insect of interest and to send, via the communication module, an indication of whether the disease is carried by the insect of interest to a server remote from the insect monitoring and analyzing system.

BRIEF DESCRIPTION OF THE FIGURES

FIG. 14 shows a cross section through the arm simulator of FIGS. 12 and 13, in an embodiment.

DETAILED DESCRIPTION OF THE EMBODIMENTS

In understanding current methods for collecting data on the mosquito population in a particular area, it became apparent that significant human effort was required. Further, it became apparent that to perform a count of mosquitoes, a person rolled up their sleeve, and counted insects landing on their forearm for a defined period, thereby suffering mosquito bites during the counting process. Given the spread of deadly diseases by insects, it became apparent that a better method and preferably an automated method were desired.

To ensure that data collected by other methods is compatible with data already collected using the human forearm approach, it appears that the human body, from the perspective of the insects, must be replicated. The embodiments disclosed herein replicate human features that attract insects, such as by expelling gasses that resemble gases given off by human, simulating human movement, simulating body heat, and simulating one or more of texture, pliability, and other characteristics of the human body important to insects, particularly the forearm.

Figure 1:
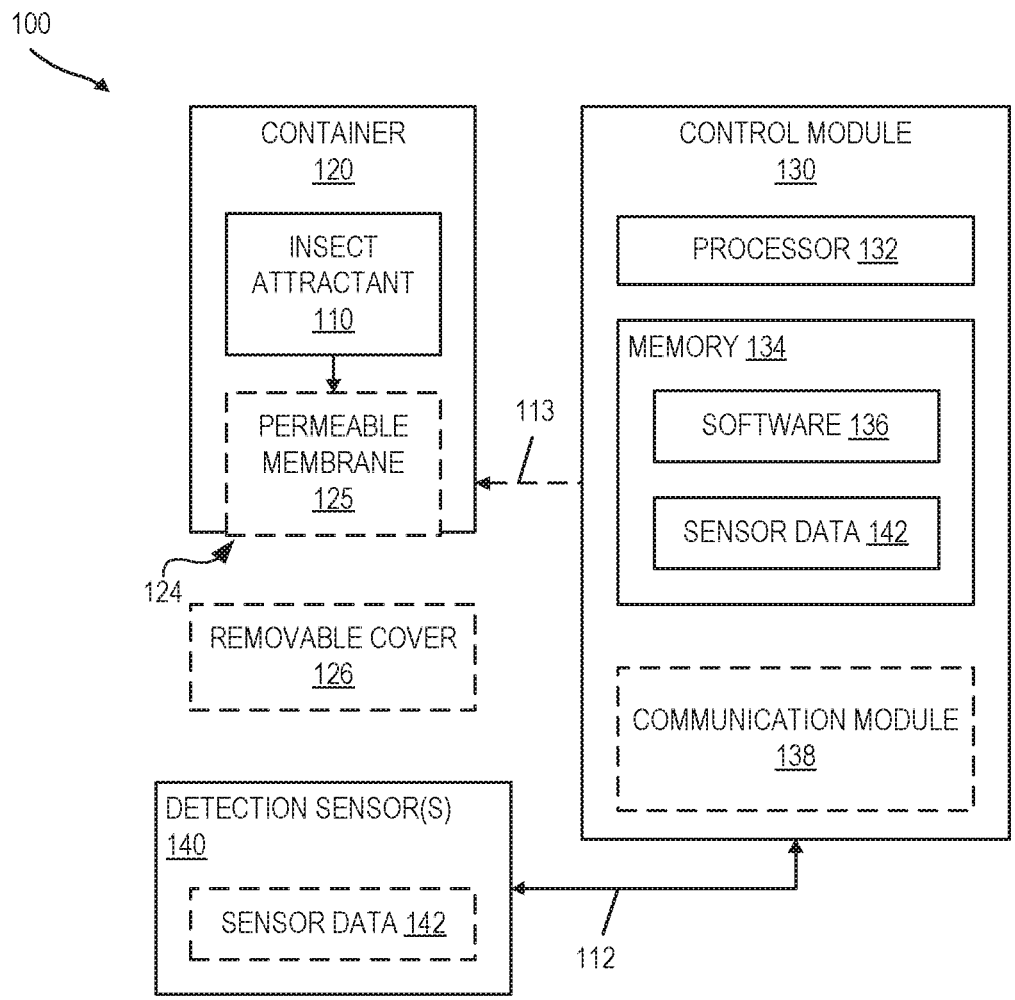
FIG. 1 is a block diagram illustrating one exemplary remote insect monitor, in an embodiment.

FIG. 1 is a block diagram illustrating one exemplary remote insect monitor 100. Monitor 100 includes an insect attractant 110 within a container 120. In certain embodiments, insect attractant 110 is a gas or volatile liquid that is released (e.g., through one or more apertures) into ambient air proximate a landing area 124 of container 120. In one example, insect attractant 110 includes carbon dioxide ($CO_2$) gas, which is expelled during human respiration, and liquid octenol, which is expelled in human breath and sweat. Both $CO_2$ and octenol are attractants of some biting insects such as mosquitos. Insect attractant 110 may employ and/or include other individual attractants and mixtures of attractants without departing from the scope hereof. In certain embodiments, insect attractant 110 is configured to attract specific species of insects.

In certain embodiments, at least a portion of the exterior surface of container 120 may include a permeable membrane 125 that forms landing area 124. Permeable membrane 125 is permeable to insect attractant 110, and thereby releases insect attractant 110 to ambient air proximate landing area 124. Thus, permeable membrane 125 is attractive to certain insects as insect attractant 110 dissipates into the ambient air. In one embodiment, permeable membrane 125 is made from a gas permeable material such as polydimethylsiloxane (PDMS), which is permeable to gases such as $CO_2$ but is impermeable to liquid water and thereby prevents rain intrusion into container 120 for example. A rate of transmittance of insect attractant 110 from container 120 is determined by a surface area and a permeability of permeable membrane 125, which may be configured based upon thickness and the type (such as PDMS for example) of membrane material used.

In embodiments, monitor 100 is configured such that landing area 124 mimics an adult human forearm such that monitor 100 produces an insect count that is comparable to a rate of insects landing on the human forearm (as conventionally used to determine a count of mosquitoes). For example, the landing area 124 (i.e., the exposed surface area of permeable membrane 125) may be similar to that of a human adult's forearm, the type of attractant(s) in insect attractant 110 may be similar to those produced by a human adult, and a rate of insect attractant dissipation may be similar to dissipation rates from a human adult's forearm. In one embodiment, monitor 100 is calibrated to produce landing rates for different insect species that are comparable to typical landing rates on a human adult forearm. In another embodiment, insect landing rate data determined from monitor 100 is correlated with insect landing rate data for an adult forearm to determine a conversion factor that allows comparison of landing rates between the two methods. Thus, data collected by monitor 100 may be used interchangeably with data collected conventionally using human adult forearms.

Monitor 100 further includes a detection sensor(s) 140 for detecting insects attracted by insect attractant 110 to landing area 124. In particular embodiments, detection sensor(s) 140 is a digital camera that detects one or both of visible light as well as infrared (IR) light. Detection sensor(s) 140 may capture high-definition (HD) quality images (e.g., using an HD capable camera) of landing area 124 that form part of sensor data 142. Detection sensor(s) 140 may include two separate cameras, a first camera for HD quality and a second camera for IR imaging, without departing from the scope hereof. Detection sensor(s) 140 optionally includes a light, such as a flash for example, to illuminate landing area 124 for capturing quality images of insects independent of ambient lighting. In certain embodiments, detection sensor(s) 140 may include a microphone to detect sound waves proximate landing area 124, and a control module 130 to process the detected sound wave and differentiate insect species based on sound produced during flight of the insects, for example. For example, control module 130 may analyze the detected sounds to identify certain insect species and/or sub-species based upon a frequency of the insect's wing beats detectable in the audio.

Control module 130 includes a processor 132, a memory 134, and software 136 coupled to detection sensor(s) 140 via communication path 112. Memory 134 may represent one or more of volatile memory such as RAM and non-volatile memory such as, ROM, EEPROM, Flash-EEPROM, magnetic media including disk drives, and optical media. Memory 134 stores software 136 as machine readable instructions executable by processor 132 to control detection sensor(s) 140 to generate sensor data 142 for insects attracted to the insect attractant 110 proximate landing area 124 and to store sensor data 142 within memory 134.

Control module 130 may optionally include a communication module 138 for transmitting sensor data 142, received from detection sensor(s) 140 via communication path 112, to external computer systems. Communication module 138 is for example a wireless transceiver that communicates using one or more protocols selected from the group including: Wi-Fi (IEEE 802.11), Bluetooth (over IEEE 802.15.1), Bluetooth Low Energy, Cellular, (LTE, 3G, 4G, 5G, NB-1, etc), ultra-wideband (UWB, over IEEE 802.15.3), ZigBee (over IEEE 802.15.4), and so on. In certain embodiments, control module 130 is integrated within detection sensor(s) 140 such that data is stored locally in a memory of detection sensor(s) 140. Control module 130 controls detection sensor(s) 140, via a communication path 112, to capture sensor data 142 (e.g., audio data from a microphone and/or one or more of images, image sequences, and videos from one or more image sensors).

Communication path 112 may include one or both of a wired and/or a wireless communication media. Sensor data 142 is digitally sent via communication path 112 from detection sensor(s) 140 to control module 130 where it is stored within memory 134. For example, following activation of container 120 to release insect attractant 110 proximate landing area 124 (e.g., via permeable membrane 125), control module 130 may control detection sensor(s) 140 to capture a sequence of images at a predetermined rate for a predetermined duration (e.g., one set of images every tenth of a second for one second each minute for the next hour).

In an embodiment, container 120 optionally includes a removable cover 126 disposed over permeable membrane 125. Removable cover 126 is made of non-permeable material to prevent dissipation of insect attractant 110 and may be periodically removed and subsequently replaced to release a defined quantity (also referred to as a "dose" herein) of insect attractant 110. Controlled release of a defined quantity of insect attractant 110 may be performed by manually removing and subsequently replacing removable cover 126. Alternatively, removable cover 126 may be motorized and controlled by control module 130 to open for a defined release period and then closed, thereby releasing a dose (i.e., a measured quantity based upon permeability of membrane 125 and its area) of insect attractant 110. When motorized, control module 130 may control removable cover 126 via a communication path 113, which is similar to communication path 112 and includes one or both of wired and wireless communication media. Thus, a desired quantity (i.e., a dose) of insect attractant 110 may be automatically released into ambient air at desired times, such as once per day for example, and sensor data 142 captured for a corresponding sampling period, such as for five minutes after release of insect attractant 110.

Control module 130 may be remotely programmed to define one or more release periods and sample periods. Control module 130 may receive configuration data defining one or more of an insect attractant dose, a sample period, and a sample schedule. For example, control module 130 may be configured to expose permeable membrane 125 for one minute, collect sample data for five minutes starting when membrane 125 is exposed, and repeat the sampling at 6 AM, noon, and six PM, for each of the next seven days. Control module 130 may include a real-time clock, for example, to determine when to monitor insects.

Insects captured within images and/or video of sensor data 142 may be counted manually (e.g., by human eye). However, image processing may be used to automate counting of insect within sensor data 142. In one embodiment, software 136 of control module 130 includes machine readable instructions that when executed by processor 132 perform image processing algorithms to count insects within sensor data 142, wherein the count of insects detected within sensor data 142 (and optionally sensor data 142) is periodically communicated to a remote server via communication module 138 for example. In another embodiment, sensor data 142 is sent, via a communication module 138, to a remote server that implements image processing algorithms to count insects within sensor data 142. Although a single count is illustrated in these embodiments herein, system 100 may be configured to identify and count different insect species and/or sub-species, without departing from the scope hereof.

Monitor 100 may be configured to automatically release insect attractant 110, capture sensor data 142, and determine a count of insects therein, at predefined times and/or intervals. Monitor 100 may also be remotely programmed and/or triggered to open and close removable cover 126 for a determined period to release a dose of insect attractant, and determine a count of insects within sensor data 142 captured during a corresponding sample period. For example, removable cover 126 may be opened for one minute to release a dose of insect attractant 110 and sensor data 142 may be captured by detection sensor(s) 140 for a sample period of five minutes. A plurality of monitors 100 may be geographically dispersed and wirelessly networked (e.g., using communication module 138) to simultaneously and remotely monitor insects of interest (see, for example, FIG. 4).

Figure 2:
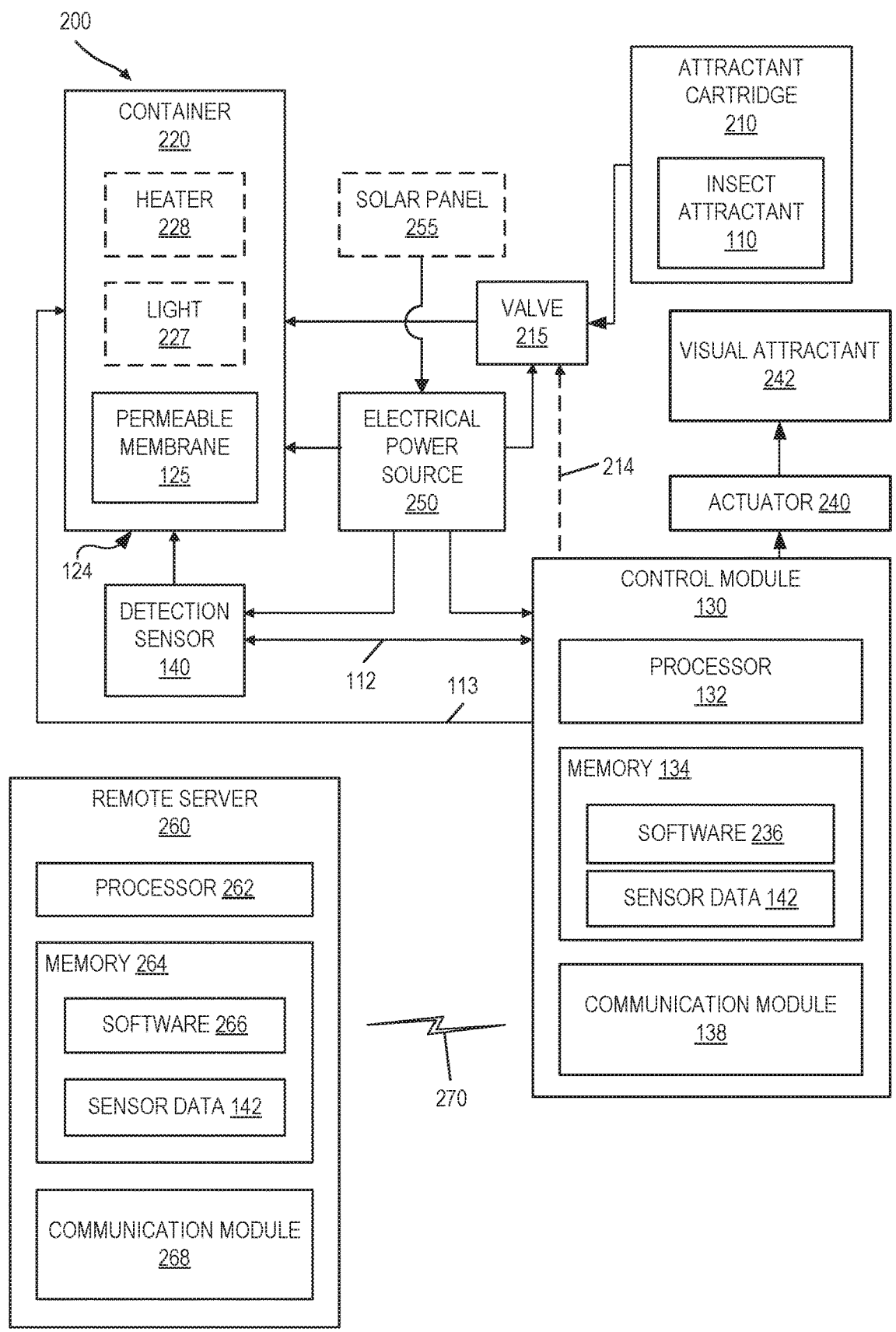
FIG. 2 is a block diagram illustrating another exemplary remote insect monitor, in an embodiment.

FIG. 2 is a block diagram illustrating one exemplary remote insect monitor 200 that is similar to monitor 100, FIG. 1, but includes insect attractant 110 within an attractant cartridge 210. Features of remote insect monitor 200 that are identical to monitor 100 are enumerated with like numerals and their description is not repeated.

Attractant cartridge 210 is for example a replaceable cartridge or canister containing insect attractant 110 in the form of a compressed gas (i.e., under pressure greater than one atmosphere). Remote insect monitor 200 has an inflatable container 220 (in place of container 120) that is inflated by insect attractant 110 from attractant cartridge 210 via a valve 215. Software 236 is similar to software 136 of remote insect monitor 100, but includes additional machine readable instructions for controlling valve 215 (or a pump) as described below.

Valve 215 couples attractant cartridge 210 to inflatable container 220 via tubing for example, and is controlled by control module 130 to allow a dose of insect attractant 110 to flow from attractant cartridge 210 to inflatable container 220. Valve 215 is for example a servo driven linear actuator that is controlled by control module 130 via communication path 214, wherein control module 130 opens valve 215 for a defined period to allow a desired quantity of insect attractant 110 to flow from attractant cartridge 210 to inflatable container 220. Communication path 214 is similar to communication paths 112 and 113 of FIG. 1. In certain embodiment, valve 215 is a digital control valve and/or regulator that provides local control functionality via a programmable logic controller (PLC) or microcontroller for example. Without departing from the scope hereof, insect attractant 110 may be a liquid and valve 215 may represent a pump (see, for example, pump 316 of FIG. 3 and the associated description below).

In certain embodiments, remote insect monitor 200 includes a plurality of different types of insect attractant 110 stored in a respective plurality of attractant cartridges 210, where each attractant cartridge 210 is coupled to inflatable container 220 via separates valves 215 or pumps such that remote insect monitor 200 may selectively attract different insects for counting.

In certain embodiments, container 220 includes a light 227 for assisting detection sensor(s) 140, for example to illuminate landing area 124 (e.g., permeable membrane 125) for imaging. In other embodiments, light 227 is configured to attract certain species of insects. For example, light 227 may be one or more of a white light, an ultraviolet (UV) light, and a narrow spectrum light-emitting diode (LED), such as a green LED and a blue LED. Thus, light 227 may be selectively controlled to preferentially attract different species of insect, such as different species of mosquito for example. In certain embodiments, permeable membrane 125 is at least partially transparent such that light from light 227, positioned within container 120, passes through membrane 125 to attract certain insects to land thereon. In certain embodiments, the permeable membrane is at least partially translucent. In certain embodiments, light 227 is modulated to simulate movement of a human adult's arm (or body). In other embodiment, light 227 represents multiple lights that are positioned and modulated to simulate movement of a human adult's arm (or body). In certain embodiments, light 227 is configured to emit light at the infrared wavelength and detection sensor 140 is operable to detect light in the infrared wavelength. Further, light 227 may be switchable between emitting visible light and emitting infrared light, and detection sensor 140 may be switchable between detecting visible light and detecting infrared light.

In certain embodiment, container 220 may also include a heater 228 for providing at least the following two functions: first, heat is an attractant of some insects such as mosquitos and may be used in combination with one or more other types of insect attractant 110; and second, heat may be used to improve vapor volatility of insect attractant 110 and thereby increase dissipation rate of insect attractant 110 proximate landing area 124 (e.g., through permeable membrane 125). Further, heater 228 may also be used to increase similarity of landing area 124 to an adult human forearm, for example by maintaining the temperature of landing area 124 to be similar to the temperature of a human adult's forearm.

In certain embodiments, system 200 also includes an actuator 240 that is controlled by control module 130 to physically move a visual attractant 242. For example, this physical movement may be random or repetitive to simulate movement of a human, where such movement attracts the insects.

Remote insect monitor 200 is powered by an electrical power source 250 that may represent one or more of a battery, a rechargeable battery, and a solar panel 255. For example, solar panel 255 may charge a rechargeable battery to ensure power is continuously applied to remote insect monitor 200. Electrical power source 250 provides for example electrical power (e.g., direct current (DC) and/or alternating current (AC) electrical power) as needed by components of remote insect monitor 200, including but not limited to valve 215, control module 130, detection sensor(s) 140, light 227, and heater 228. In certain embodiments, light 227 and/or heater 228 may be positioned external to container 220.

Remote insect monitor 200 may communicate using communication module 138 with a remote server 260 via a wireless communication path 270. Remote server 260 is for example a computer having a processor 262, a memory 264 storing software 266, and a communications module 268. Remote server 260 may be configured to communicate with multiple monitors 100, 200 to transmit configuration instructions thereto and to receive sensor data 142 therefrom. In an embodiment, sensor data 142 stored in memory 134 of control module 130 is periodically transmitted via wireless communication path 270 to memory 264 of remote server 260. After confirmation of successful data transmission from memory 134 to memory 264, sensor data 142 may be cleared from memory 134.

Figure 3:
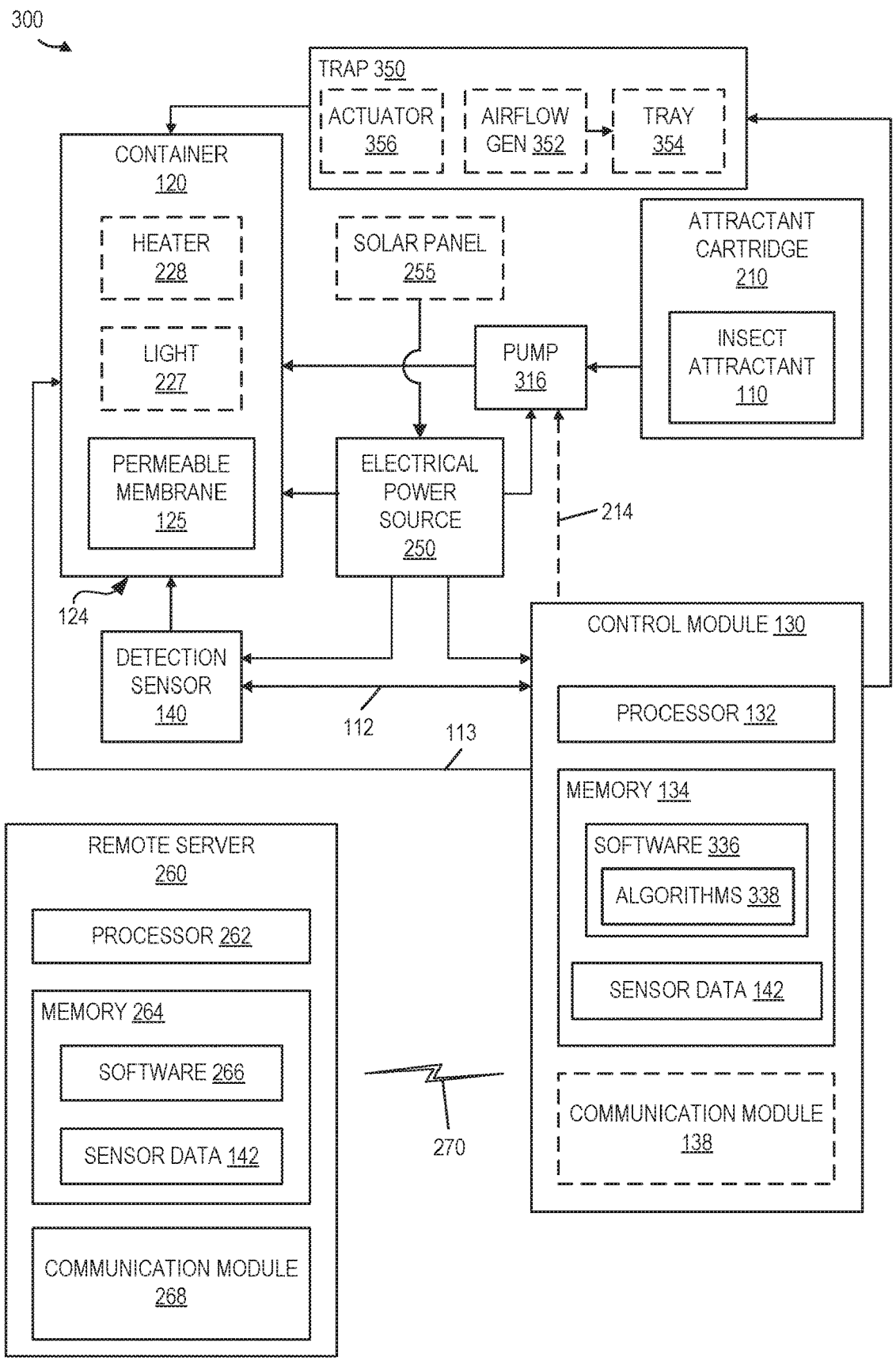
FIG. 3 is a block diagram illustrating one exemplary remote insect monitoring and trapping system, in an embodiment.

FIG. 3 is a block diagram illustrating components of a remote insect monitor and trap 300 that is similar to remote insect monitor 200 of FIG. 2 but includes an insect trap 350. Monitor and trap 300 may have certain features that are similar to monitors 100/200 are enumerated with like numerals and their description is not repeated. Insect monitor and trap 300 includes a pump 316 as an alternative to valve 215 for use with a liquid insect attractant 110. Pump 316 is for example a peristaltic pump for pumping insect attractant 110 to container 120 via flexible tubing. Software 336 includes functionality of software 136 and software 236 and includes additional machine readable instructions that control pump 316 to pump a dose (i.e., a desired quantity) of insect attractant 110 from attractant cartridge 210 to container 120. System 300 may also include a visual attractant similar to visual attractant 242 and actuator 240 of system 200.

Trap 350 captures insects for additional study, for example to determine insect species distribution or to test samples for infectious disease agents (e.g., parasites, bacteria, viruses, etc.). Trap 350 may utilize an airflow generator 352 (e.g., implemented as a fan or a vacuum source) to move insects away from landing area 124 (e.g., permeable membrane 125) and onto an optional collection tray 354 or into a containment area. In embodiments, operation of trap 350 is intelligent, where control module 130 utilizes one or more algorithms 338 (e.g., an image recognition algorithm, an audio recognition algorithm, and so on) to identify an insect of interest that is proximate landing area 124 and to control airflow generator 352 to trap the identified insect within tray 354. For example, based upon real-time processing of images within sensor data 142 from detection sensor(s) 140, control module 130 may identify an insect of interest on permeable membrane 125 and operate airflow generator 352 to move that insect into tray 354. In one embodiment, trap 350 includes a hose attached to an actuator 356 (e.g., a robotic arm) that control module 130 controls, in combination with activation of airflow generator 352, to selectively capture the identified insect of interest. For example, algorithms 338 enable control module 130 to identify and locate the insect of interest within landing area 124 (e.g., on permeable membrane 125), control actuator 356 to position the hose proximate the identified insect, and then activate airflow generator 352 to suck the identified insect into tray 354. In one embodiment, algorithms 338 are configured to identify a particular species of insect for counting and/or collection. In another embodiment, algorithms 338 are configured to identify a particular sub-species of insect for counting and/or collection. In certain embodiment, where detection sensor 140 includes a microphone, algorithm 338 may uses sensed audio in part to identify the insect based upon a frequency of detected wing beats. Similarly, algorithms 338 may analyze a sequence of images captured by detection sensor 140 to determine a frequency of wing beats to identify a particular insect. In other embodiment, algorithm 338 may compare images within sensor data 142 to one or more reference images (e.g., stored within memory 134) to identify one or more insects on landing area 124 as insects of interest (e.g., for counting and/or for capture).

In another embodiment, control module 130 interactively (i.e., in real-time) communicates with remote server 260 to indicate identified insects, wherein a user of remote server 260 (e.g., an entomologist) interactively controls system 300 to view and/or capture the identified insect and/or other insects. For example, where remote server 260 is monitoring many deployed systems 300, software 266 may be configured to automatically notify the entomologist when a particular insect is identified and to configure remote server 260 for control of the associated system 300.

Remote insect monitors/traps 100, 200 and 300 of FIGS. 1, 2 and 3, respectively, may be used to determine the presence and number of insects near agricultural crops such that a farmer may know when to use pesticides. For example, by monitoring for presence of a nuisance insect near a crop, unnecessarily treatment (e.g., pesticide spraying) of the crop may be avoided and/or delayed to occur only when the nuisance insect is present and/or prevalent. Thus, unnecessary use of pesticides may be avoided. Further, once a pesticide or other form of insect control has been used, remote insect monitors/traps 100, 200 and 300 may monitor the effectiveness of the insect control.

Figure 4:
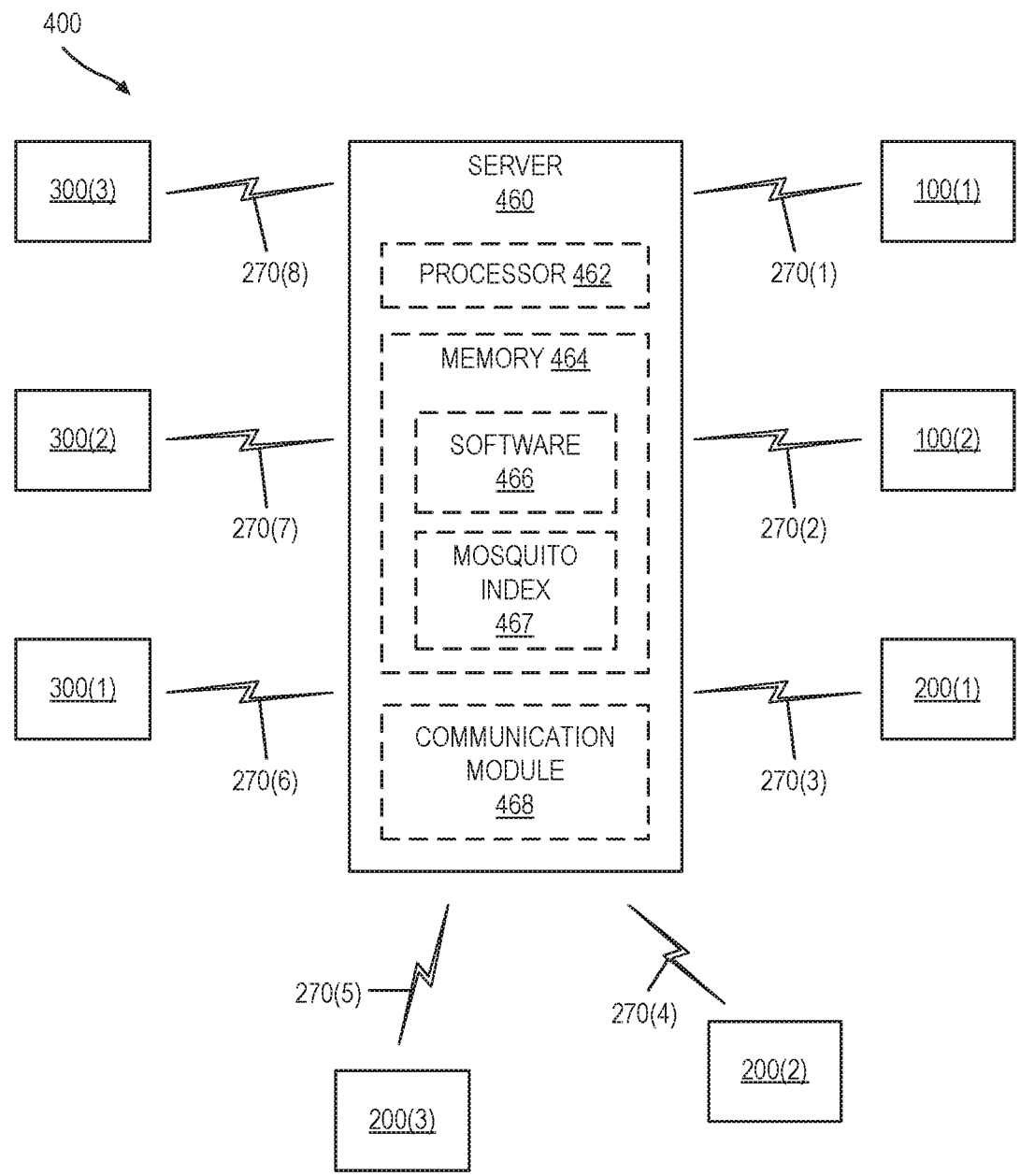
FIG. 4 is a block diagram illustrating one exemplary remote insect monitoring network, in an embodiment.

FIG. 4 schematically illustrates an exemplary remote insect monitoring network 400. Network 400 includes a remote server 460 communicatively coupled with a plurality of remote insect monitors/traps 100, 200 and 300 of FIGS. 1, 2 and 3, respectively. Remote server 460 is similar to remote server 260 of FIGS. 2 and 3 and includes at least one processor 462, memory 464, software 466, and a communications module 468. Remote server 460 communicates with control module 130 of each of the plurality of remote insect monitors/traps 100, 200, 300 via one or more wireless and/or wired communication paths 270, as shown in FIG. 4. Remote server 460 may provide instructions and configuration data (e.g., insect attractant dose, sample period, and sampling schedule) to one or more remote insect monitors/traps 100, 200, 300 and receive sensor data 142 and/or insect counts therefrom. Network 400 may include the Internet and allow geographically dispersed remote insect monitors/traps 100, 200, 300 to be controlled to simultaneously monitor insects of interest.

In certain embodiments, communication module 138 may communicate directly with another communication modules 138 in other insect monitors/traps 100/200/300 to form an ad-hoc and/or mesh network, wherein each insect monitor/trap 100/200/300 may relay (i.e., receive and retransmit) messages from other insect monitors/traps 100/200/300. Thus, remote server 460 need only communicate directly with one of the remote insect monitors/traps 100, 200, 300 in that network.

Advantageously, a scientist (e.g., an entomologist) may utilize remote server 260 to continuously and/or simultaneously monitor for presence of insects in many different and disperse remote areas. Data collected by remote server 260 may be combined with other data (e.g., weather data, topology data, terrain data, and so on) based upon the location of each insect monitors/traps 100/200/300 to have a better and more useful understanding of the data. For example, one scientist may monitor insect in many different states and thereby determine movement patterns of the insects as they are counted by insect monitors/traps 100/200/300. Such data may therefore be useful in predicting future movement patterns of the insects, and may use predictions of other data (e.g., weather) to warn of potential insect problems. In certain embodiments, server 460 includes artificial intelligence to predict movement of insects based upon weather (current and forecast), insect counts, season, insect lifecycle, and topographical features. For example, as shown in FIG. 4, server 460 may determine a mosquito index 267 based upon information received from systems 100, 200, and 300, and other prevailing and forecast information. Server 460 may thus provide a mosquito index 267 that is predictive of mosquito populations within each of many different areas, such that the public becomes aware of the need for protection against mosquitoes when outside in these areas.

Figure 5:
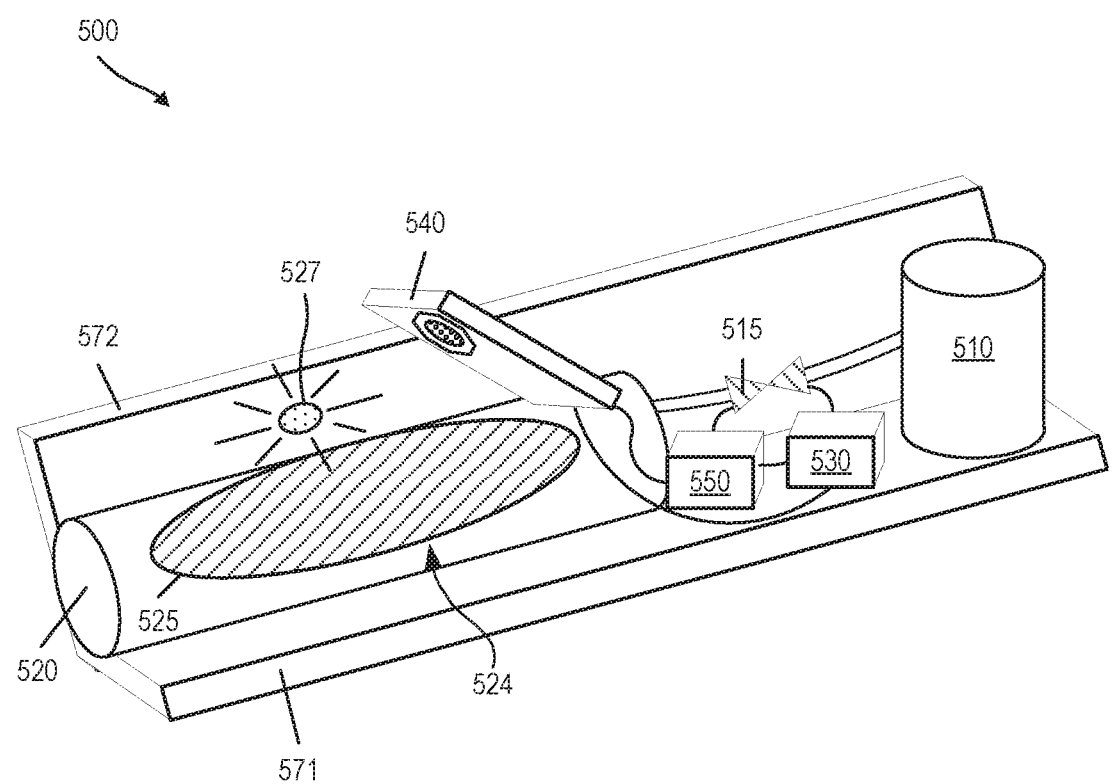
FIG. 5 is a perspective view illustrating one exemplary remote insect monitoring system, in an embodiment.

FIG. 5 is a perspective view of one exemplary remote insect monitor 500 that is similar to remote insect monitor 200 of FIG. 2. Remote insect monitor 500 includes an attractant cartridge 510 that contains insect attractant 110, fluidly coupled to a container 520 via a valve 515. Container 520 includes a landing area 524 formed of a permeable membrane 525 that allows insect attractant 110 to permeate out to ambient air. Remote insect monitor 500 further includes a detection sensor 540 for detecting insects attracted to insect attractant 110 at landing area 524, and a light 527 to illuminate landing area 524 for imaging of insects by detection sensor 540 as well as for attracting insects of interest to landing area 524. Light 527 may include a plurality of lights, such as a plurality of LEDs including different color LEDs, without departing from the scope hereof.

A control module 530 controls valve 515, detection sensor 540, and light 527 using power from an electrical power source 550. Attractant cartridge 510, valve 515, container 520, permeable membrane 525, light 527, control module 530, detection sensor 540, and electrical power source 550 may represent attractant cartridge 210, valve 215, container 120, permeable membrane 125, light 227, control module 130, detection sensor(s) 140, and electrical power source 250 of FIG. 2, respectively.

Remote insect monitor 500 further includes a first shield 571 and a second shield 572 adjacent to container 520 for shielding permeable membrane 525, control module 530, detection sensor 540, and electrical power source 550, from weather, such as direct sunlight, rain, and wind, for example. First shield 571 and/or second shield 572 may be used for mounting components of remote insect monitor 500, such as light 527 and detection sensors 540, for example.

Figure 6:
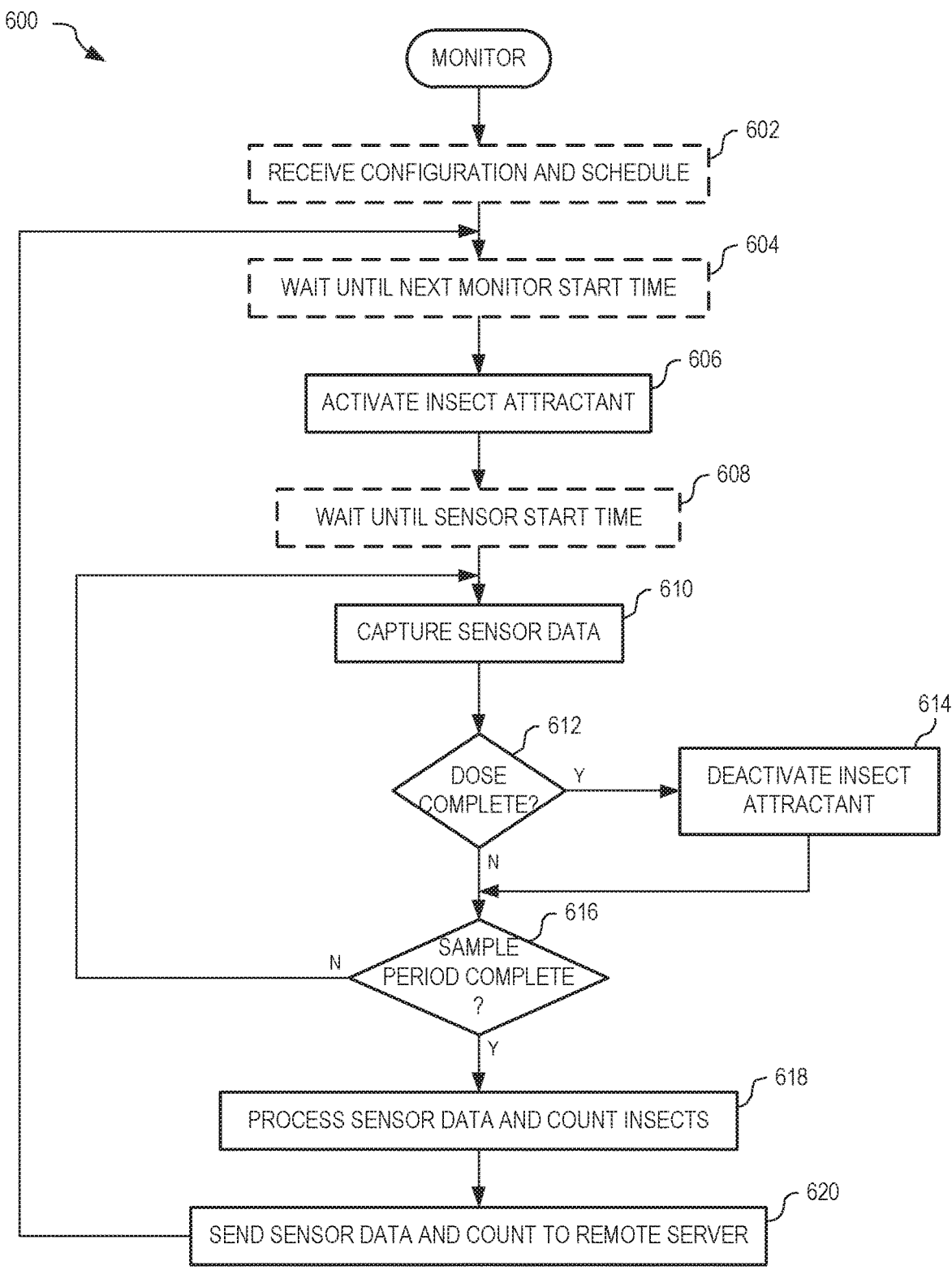
FIG. 6 is a flowchart illustrating one exemplary method for remotely detecting insects, in an embodiment.

FIG. 6 is a flowchart illustrating one exemplary method 600 for remotely detecting insects. Method 600 is for example implemented within software 136 of remote insect monitor 100 of FIG. 1, software 236 of remote insect monitor 200 of FIG. 2, and within remote insect monitor/trap 300 of FIG. 3.

Step 602 is optional. If included, in step 602, method 600 receives configuration and schedule. In one example of step 602, control module 130 receives from remote server 260 and via communication module 138, configuration data defining a dose of insect attractant 110, a sample period, and a schedule defining monitoring times.

Step 604 is optional. If included, in step 604, method 600 waits until a next monitor start time. In one example of step 604, control module 130 waits until a next scheduled monitor time defined within a schedule received in step 602. In step 606, method 600 activates the insect attractant. In one example of step 606, control module 130 controls a motor to remove removable cover 126 from permeable membrane 125. In another example of step 606, control module 130 controls valve 215 to allow insect attractant 110 to flow from attractant cartridge 210 into container 220. In another example of step 606, control module 130 activates pump 316 to pump insect attractant 110 from attractant cartridge 210 into container 220.

Step 608 is optional. If included, in step 608, method 600 waits until a sensor start time. In one example of step 608, control module 130 waits one minute after activating insect attractant 110. In step 610, method 600 captures sensor data. In one example of step 610, control module 130 captures an image of landing area 124 (e.g., permeable membrane 125) and any proximate insects using one or more image sensors of detection sensor(s) 140 and stores the image as sensor data 142 within memory 134.

Step 612 is a decision. If, in step 612, method 600 determines that the dose of insect attractant is complete, method 600 continues with step 614; otherwise, method 600 continues with step 616. In one example of step 612, the dose of insect attractant 110 is complete when removable cover 126 has been off of permeable membrane 125 for one minute. In another example of step 612, the dose of insect attractant 110 is complete when valve 215 has been active for fifteen second. In another example of step 612, the dose of insect attractant 110 is complete when pump 316 has been active for five seconds.

In step 614, method 600 deactivates the insect attractant. In one example of step 614, control module closes removable cover 126. In another example of step 614, control module 130 deactivated valve 215. In another example of step 614, control module 130 stops pump 316.

Step 616 is a decision. If, in step 616, method 600 determines that the sample period is complete, method continues with step 618; otherwise, method 600 continues with step 610. Steps 610 through 616 repeat to periodically capture sensor data 142 from detection sensors 140, and to store the sensor data 142 within memory 134.

In step 618, method 600 processes sensor data and counts insects. In one example of step 618, control module 130 executes one or more algorithms 338 to process sensor data 142 and count insects proximate landing area 124 (e.g., proximate permeable membrane 125). In step 620, method 600 sends sensor data and count to a remote server. In one example of step 620, control module 130 sends sensor data 142 and a determine count of insects detected during the sample period to remote server 460 via communication module 138.

Method then continues with step 604, to wait until a next schedule monitor period, wherein steps 604 through 620 repeat.

Figure 7:
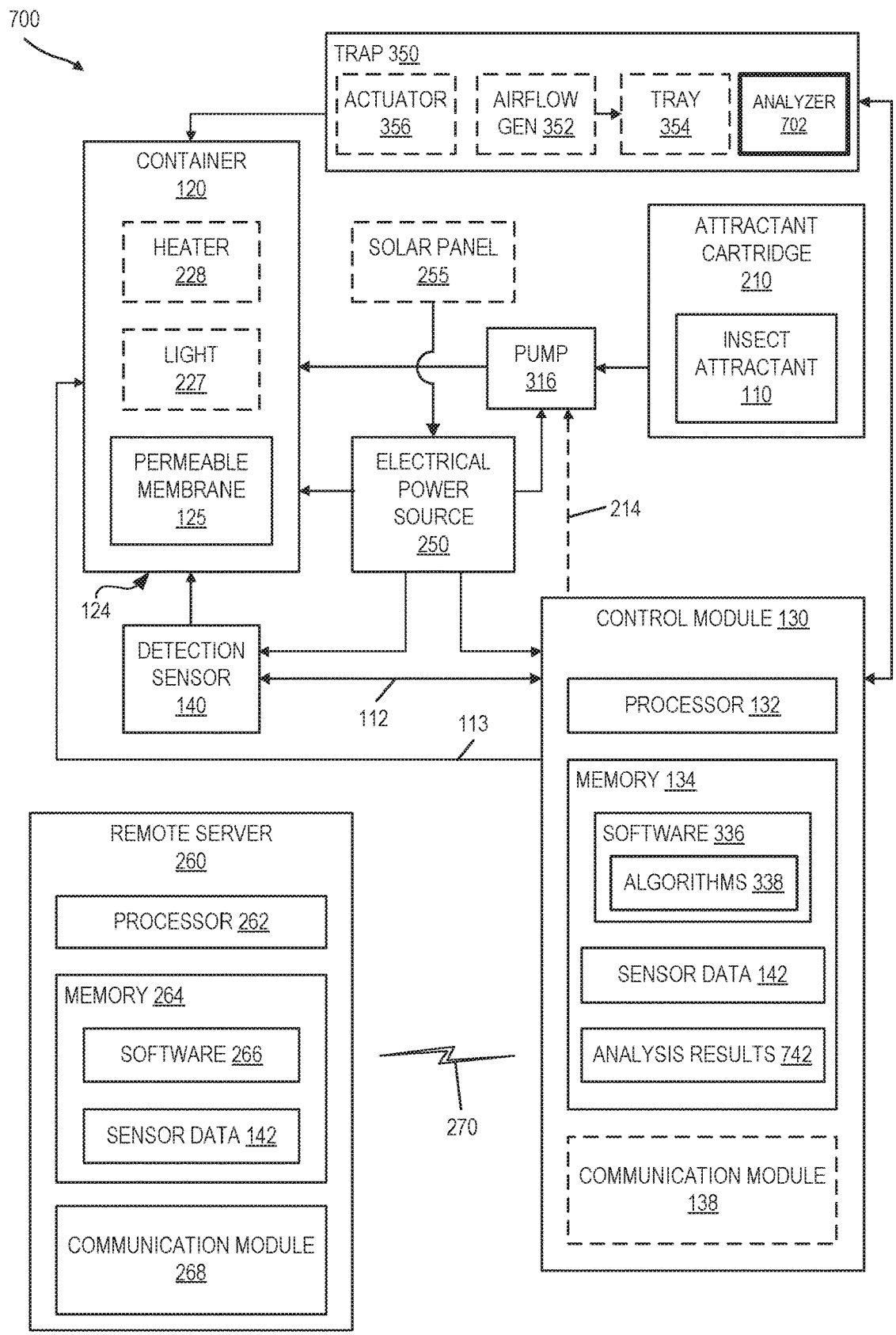
FIG. 7 is a block diagram illustrating one exemplary system for remotely detecting the spread of infectious disease agents by insects, in an embodiment.

FIG. 7 is a block diagram illustrating one exemplary system 700 for remotely detecting spread of infectious disease agents by insects. System 700 is similar to remote insect monitor/trap 300 of FIG. 3 but includes an analyzer 702 that processes captured insects to detect disease. For example, analyzer 702 may liquefy the insect and perform a DNA analysis to detect the presence of one or more diseases. Analyzer 702 may implement other methods of analysis and disease detection without departing from the scope hereof. Analyzer 702 is controlled by control module 130 and receives analysis results 742 from analyzer 702. System 700 may also include a visual attractant such as visual attractant 242 operated by actuator 240 of system 200 of FIG. 2.

Advantageously, algorithms 338 implemented within software 336 of control module 130 may select one or more particular insects for analysis by analyzer 702, thereby improving the quality and reliability of results from system 700. For example, trap 350 may utilize airflow generator 352 (e.g., implemented as a fan or a vacuum source) to move insects away from landing area 124 (e.g., permeable membrane 125) and onto collection tray 354, into a containment area, or directly into analyzer 702. That is, system 700 does not simply attract, capture, and analyze all insects within the vicinity of system 700, but may identify, selectively capture, and thus selectively analyze insects of interest. More particularly, system 700 provides evidence (e.g., within images of sensor data 142) of the identified insects of interest, and thereby improves the quality of analysis results 742. System 700 may also selectively collect a plurality of insects for analysis by analyzer 702. Thus, analyzer 702 advantageously is able to identify both the disease and the disease carrying insect.

As with remote insect monitor/trap 300, system 700 may communicate with remote server 260 to receive configuration data defining the insect species, sub-species, etc., for capture and analysis, and to report sensor data 142 and/or analysis results 742.

When deployed remotely as described with respect to FIG. 4, system 700 provides automatic detection and warning of disease being spread by insects. For example, by deploying one or more of system 700 on the outskirts of an area where a certain disease (e.g., the Zika virus) has not reached, and configuring each system 700 to periodically test only mosquitoes for the Zika virus, remote server 460 and systems 700 provide an automatic early warning of the spread of the Zika virus by mosquitoes. By specifically configuring system 700 with insect attractant 110 that attracts mosquitoes, and configuring analyzer 702 to test for presence of the Zika virus, or other specific insect-transmitted diseases, system 700 may be strategically deployed such that remote server 460 provides reliable tracking of the spread of the virus. The features of remote insect monitor/trap 300 and analysis by analyzer 702 may be combined such that system 700 provides both conventional insect monitoring and specific insect testing for disease—all autonomously and remotely.

Further, where insect control (e.g., spraying, genetic modification, etc.) has been employed, one or more of remote insect monitors/traps 100, 200 and 300 of FIGS. 1, 2 and 3, and system 700 of FIG. 7 may be deployed remotely to monitor the effect of the insect control and to provide indication as to whether and/or when additional insect control may be needed. For example, remote insect monitors/traps 100, 200 and 300 and system 700 may be deployed to remotely and autonomously monitor population of specific insects species and/or sub-species such that an alert may be generated where the insect population is not sufficiently controlled at specific locations.

Figure 8:
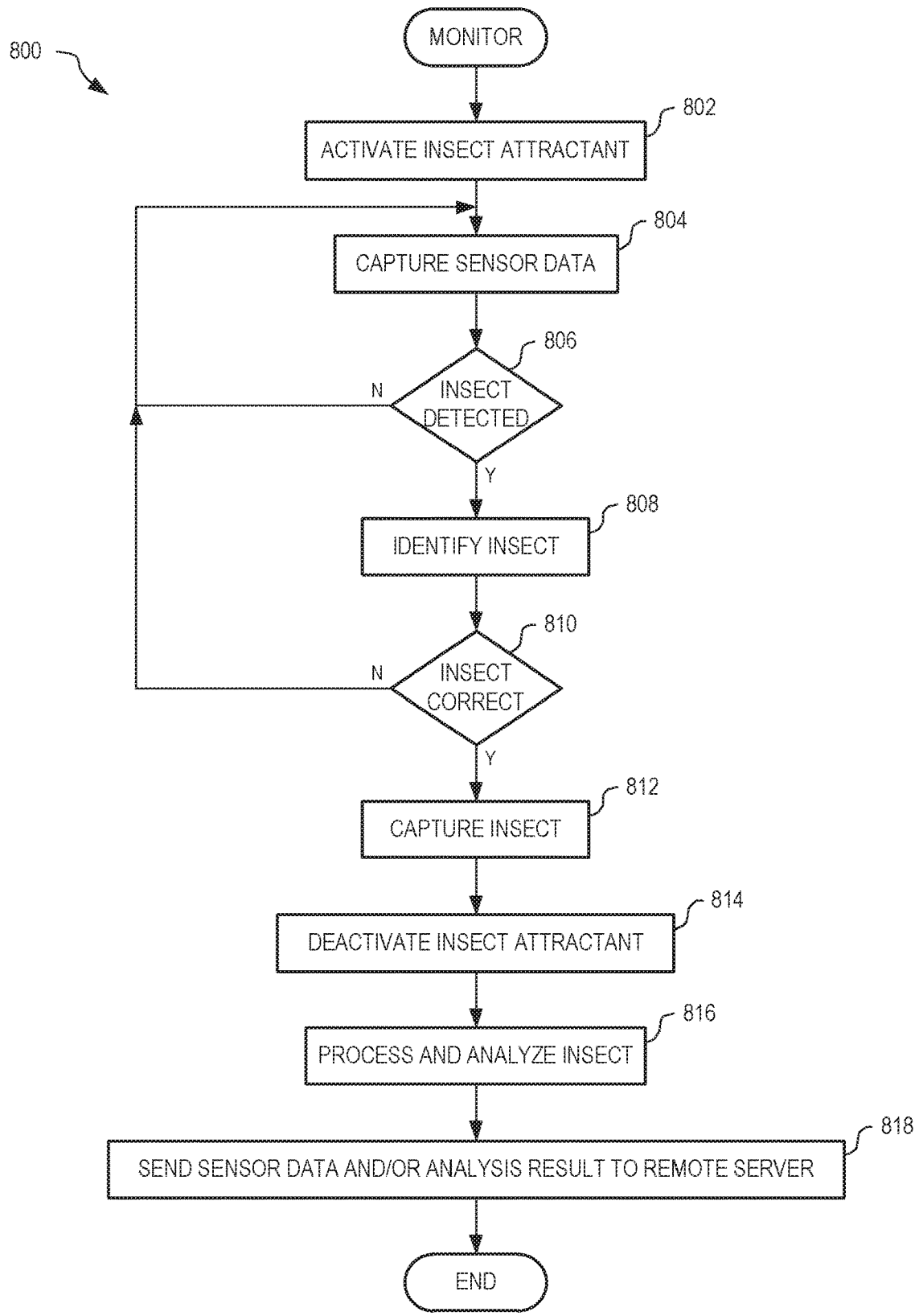
FIG. 8 is a flowchart illustrating one exemplary method for remotely detecting the spread of infectious disease agents by insects, in an embodiment.

FIG. 8 is a flowchart illustrating one exemplary method 800 for remotely detecting the spread of infectious disease agents by specific insects. Method 800 is for example implemented within control module 130 of system 700 of FIG. 7.

In step 802, method 800 activates an insect attractant. In one example of step 802, control module 130 controls a motor to remove removable cover 126 from permeable membrane 125. In another example of step 802, control module 130 controls valve 215 to allow insect attractant 110 to flow from attractant cartridge 210 into container 220. In another example of step 802, control module 130 activates pump 316 to pump insect attractant 110 from attractant cartridge 210 into container 220.

In step 804, method 800 captures sensor data. In one example of step 804, control module 130 captures an image of landing area 124 (e.g., of permeable membrane 125) and any proximate insects using one or more image sensors of detection sensor(s) 140 and stores the image as sensor data 142 within memory 134.

Step 806 is a decision. If, in step 806, method 800 determines that the captured sensor data includes an insect, method 800 continues with step 808; otherwise, method 800 continues with step 804. Steps 804 and 806 thus repeat until an insect is detected.

In step 808, method 800 identifies the insect. In one example of step 808, control module 130 executes one or more algorithms 338 to process sensor data 142 and identify (e.g., using image matching) the insect proximate landing area 124 as an insect of interest. Where multiple insects are present on landing area 124, one or more of these insects may be identified. Step 810 is a decision. If, in step 810, method 800 determines that the insect is correctly identified (i.e., of the correct species and/or sub-species), method 800 continues with step 812; otherwise, method 800 continues with step 804. Steps 804 through 810 repeat until an insect of the correct type is identified.

In step 812, method 800 captures the identified insect of interest. In one example of step 812, airflow generator 352 is activated by control module 130 to move the identified insect away from landing area 124 and into analyzer 702, collection tray 354, or into a containment area. In another example of step 812, control module 130 utilizes actuator 356 to move a hose in combination with activation of airflow generator 352, to selectively capture the identified insect of interest.

In step 814, method 800 deactivates the insect attractant. In one example of step 814, control module closes removable cover 126. In another example of step 814, control module 130 deactivated valve 215. In another example of step 814, control module 130 stops pump 316. In step 816, method 800 processes and analyzes the insect. In one example of step 816, analyzer 702 performs a DNA analysis to detect the presence of one or more diseases (e.g., by mechanically and/or chemically liquefying the insect and then analyzing the liquid). In step 818, method 800 sends the sensor data and/or analysis results to a remote server. In one example of step 818, control module 130 sends sensor data 142 and analysis results 742 to remote server 460 via communication module 138. Method 800 may be activated periodically and/or continuously to monitor for infectious disease agent carrying insects.

Figure 9:
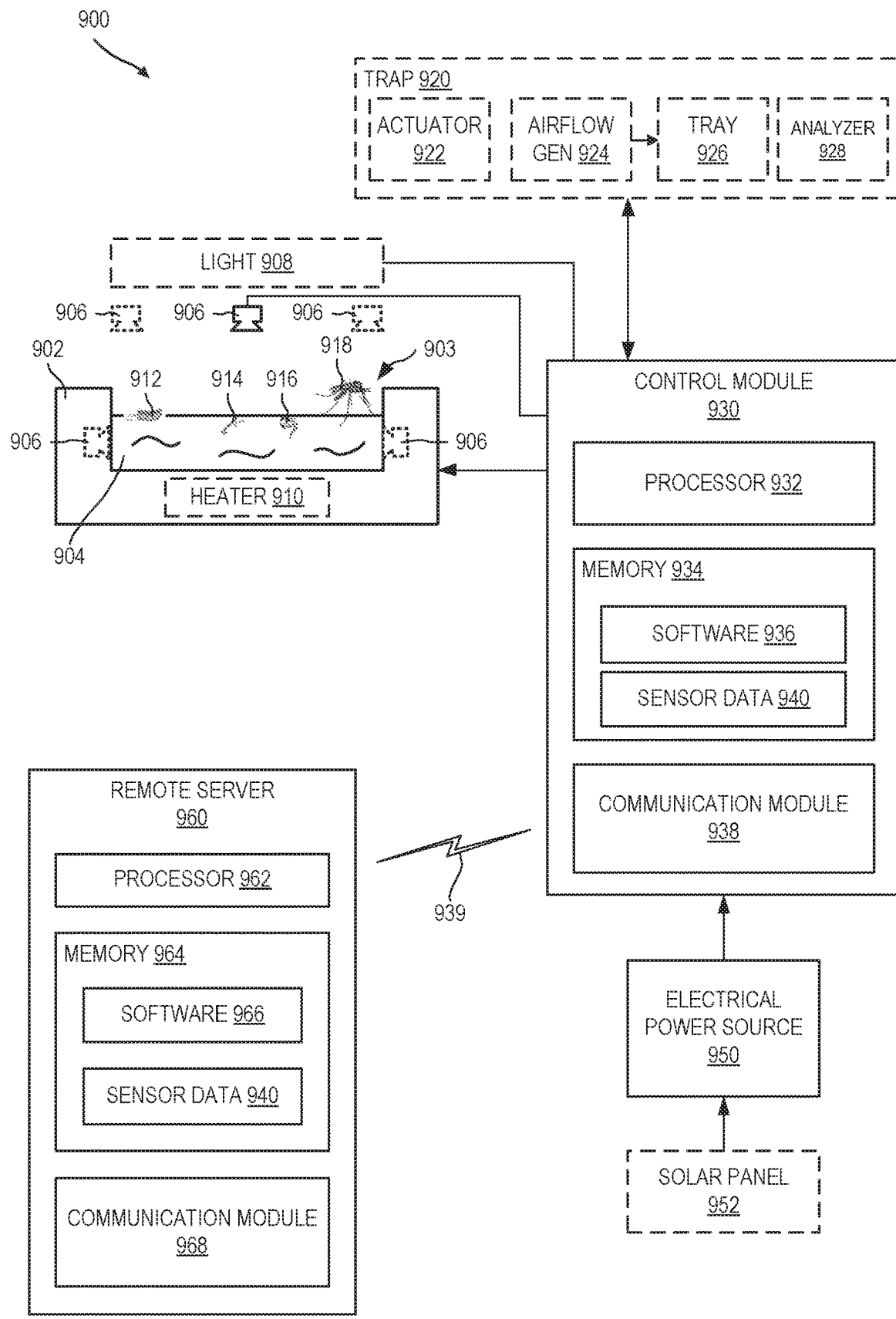
FIG. 9 is a block diagram illustrating one exemplary system for remotely detecting and monitoring insect reproduction, in an embodiment.

FIG. 9 is a block diagram illustrating one exemplary system 900 for remotely detecting and monitoring insect reproduction. System 900 includes a liquid container 902 that holds a liquid 904 (e.g., water) and has an access area 903 (e.g., an open top) and at least one detector 906 (e.g., an imaging sensor, camera, etc.). Optionally, system 900 includes a light 908 and a heater 910. System 900 is similar to remote insect monitor and trap 300 of FIG. 3 and includes a control module 930 that has a processor 932, a memory 934 storing software 936, and a communication module 938.

Optionally, system 900 may include a trap 920 that is similar to trap 320 of system 300, and includes an actuator 922, an airflow generator 924, and a tray 926 or container for capturing insects. Similar to system 700 of FIG. 7, system 900 may also include an analyzer 928 similar to analyzer 702, actuator 922 similar to actuator 322, an airflow generator 924 similar to airflow generator 324, and a tray 925 similar to tray 325, for collecting and analyzing captured insects. For example, control module 930 may utilize actuator 922 to position an open end of a tube (not shown) proximate an identified insect (of any stage) and operate airflow generator 924 to transport the insect into analyzer 928.

System 900 also includes an electrical power source 950 (e.g., a battery, rechargeable battery, etc.) and optionally includes a solar panel 952 to charge the rechargeable battery when electrical power source 950 is implemented with the rechargeable battery.

Software 936 includes machine readable instructions that when executed by processor 932 control each of detector 906, light 908 and heater 910, where included) to capture sensors data 940. In one example of operation, control module 930, under control of software 936, captures sensor data 940 from the one or more detectors 906 containing images of liquid 904 within container 902.

As is well known, certain insects (e.g., mosquitoes) reproduce by laying their eggs within standing water. Thus, these insects are attracted to lay eggs 912 within liquid 904. In certain embodiments, software 936 processes sensor data 940 to identify and quantify eggs 912 within sensor data 940. For example, software 936 may include image recognition algorithms that identify and quantify eggs 912. In certain embodiments, control module 930 controls one or both of light 908 and heater 910 to maintain an environment within container 902 suitable for the lifecycle of the insect of interest. In certain embodiments, control module 930 activates light 908 when using detectors 906 to capture sensor data 940.

Control module 930 continues to monitor liquid 904 within container 902, periodically capturing sensor data 940. In the example of FIG. 9, the life cycle of the mosquito is used, however, software 936 may be adapted to monitor the lifecycle of other insects without departing from the scope hereof. Four exemplary stages of the mosquito life cycle are, eggs 912, lava 914, pupa 916 and adult 918. Software 936 may be adapted to identify other stages and sub-stages without departing from the scope hereof. For example, sensor data 940 may include images and/or data corresponding to identified and quantified stages of the insect life cycle.

System 900 may communicate using communication module 938 with a remote server 960 via a wireless communication path 939. Remote server 960 is for example a computer having a processor 962, a memory 964 storing software 966, and a communications module 968. In an embodiment, sensor data 940 stored in memory 934 of control module 930 is periodically transmitted via wireless communication path 939 to memory 964 of remote server 960. After confirmation of successful data transmission from memory 934 to memory 964, sensor data 940 may be cleared from memory 934.

By identifying and quantifying each stage of the insect lifecycle, system 900 automatically provides data on the quantity and life stages of identified insects without requiring manual intervention. System 900 may be remotely deployed to automatically monitor for specific insects within its vicinity. By providing information on each stage of the insect's lifecycle, system 900 allows controlling sprays to be applied when most effective, for example. System 900 identifies, quantifies and reports data to server 960 for each stage of the insect lifecycle, and thereby provides additional valuable data on insect population and migration.

As with system 300 of FIG. 3, system 900 may be configured (e.g., remotely by server 960 for example) to capture one or more identified insects using trap 920. For example, control module 930 may control one or more of actuator 922, airflow generator 924, and tray 926 to selectively capture an identified insect proximate container 902 and/or liquid 904. For example, actuator 922 is controlled to position a hose proximate an insect identified within images captured by one or more detectors 906, and then airflow generator 924 is activated to move the insect through the hose into tray 926 for later analysis.

As with system 700 of FIG. 7, system 900 may also include analyzer 928 that operates to analyze a captured insect for one or more infectious disease agents carried by the insect. For example, control module 930 may control one or more of actuator 922, airflow generator 924, and analyzer 928 to selectively capture and analyze an identified insect proximate container 902 and/or liquid 904. For example, actuator 922 is controlled to position a hose proximate an insect identified within images captured by one or more detectors 906, and then airflow generator 924 is activated to move the insect through the hose into analyzer 928 where it is automatically processed to determine if one of more infectious disease agents are present. Results from analyzer 928 may be included within sensor data 940 and/or sent independently to remote server 960.

System 900 may include other features of systems 100, 200, 300, and 700 without departing from the scope hereof. System 900 may also include a liquid reservoir that automatically maintains the level of liquid 904 within container 902. In certain embodiments, system 900 includes a removable lid over access area 903 that may be motorized to automatically open and close access area 903 under control of control module 930. In certain embodiment, system 900 may include a flush mechanism (not shown) that flushes liquid 904 and nay eggs 912, lava 914, pupa 916 and adults 918 from container 902 before refilling with liquid 904. Thus, under control of control module 930 (and optionally control by remote server 960), system 900 may restart identification and quantification of insects.

In certain embodiments, system 900 may also include an insect attractant that is deployed proximate container 902.

Figure 10:
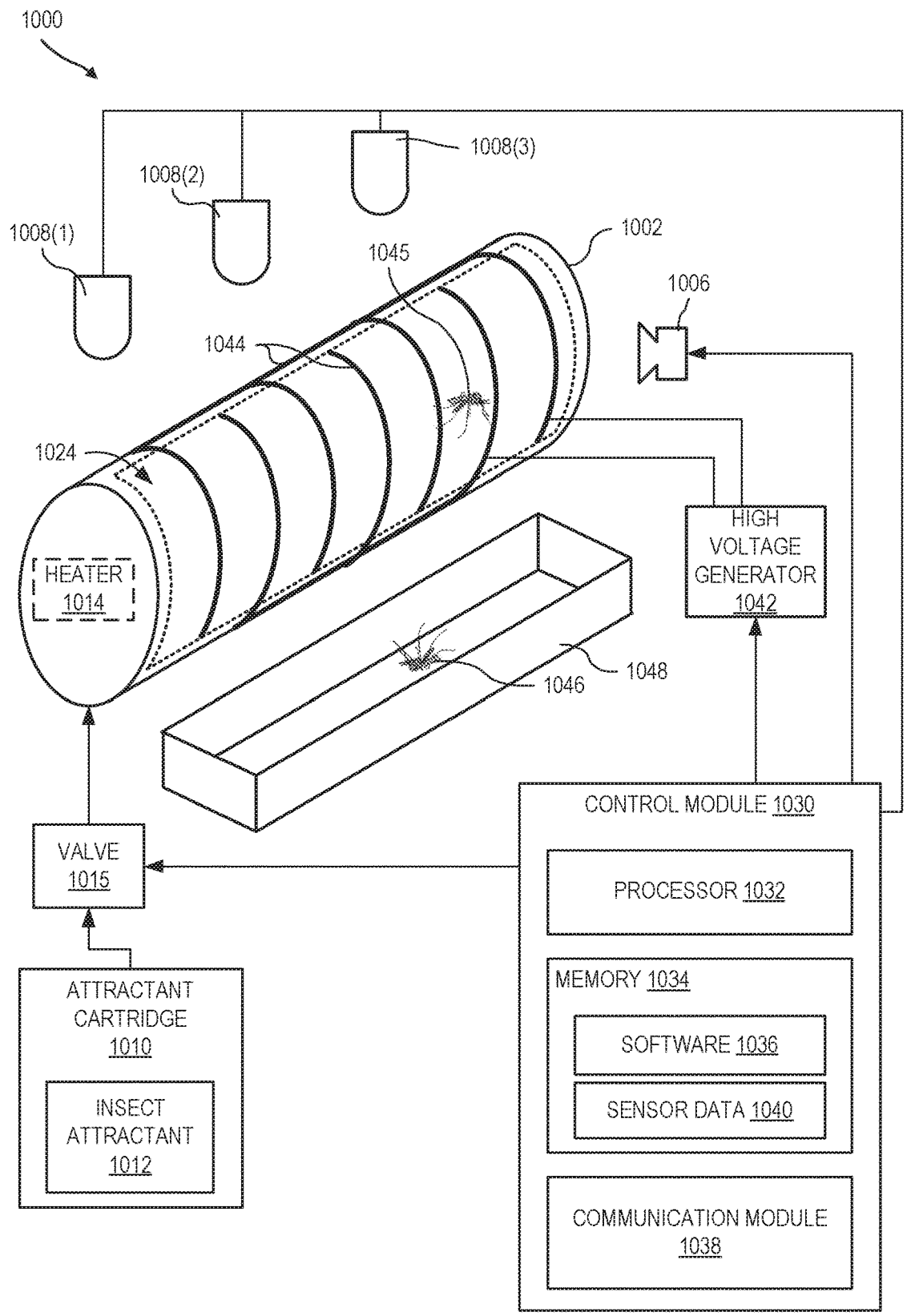
FIG. 10 is a schematic illustrating one exemplary system for remotely detecting insects, in an embodiment.

FIG. 10 is a schematic illustrating one exemplary system 1000 for remotely detecting insects, in an embodiment. System 1000 includes features similar to those of remote insect monitor 100 of FIG. 1 and remote insect monitor 200 of FIG. 2. For example, system 1000 includes a container 1002 that allows, under control of controller module 1030 using valve 1015, an insect attractant 1012 to be released near an insect landing area 1024 (indicated by dashed line). System 1000 may include one or more lights 1008 and includes one or more sensors 1006 for identifying and counting insects 1045 proximate landing area 1024. System 1000 may utilize captured audio for identifying a particular species and/or sub-species of insect, as described above, and/or may utilize images captured by an image sensor to identify and count insects 1045. System 1000 includes a control module 1030 that has a processor 1032 and memory 1034 storing software 1036 with machine readable instructions that are executable by processor 1032 to provide functionality of system 1000 described herein. Memory 1034 is also shown storing sensor data 1040 mat may include one or more of a count of insects, identifying data, images, captured audio, and so on. As with systems 100 and 200 described above, control module 1030 may include a communication module 1038 for communicating sensor data 104 to a remote server (not shown) and for receiving configuration data and/or operational commands. Further, system 1000 may include a visual attractant similar to actuator 240 and visual attractant 242 of system 200, FIG. 2.

System 1000 further includes a high voltage generator 1042 connected to an electrically conductive grid 1044 proximate landing area 1024. High voltage generator 1042 is controlled by control module 1030 to electrocute insects 1045 proximate landing area 1024. For example, once an insect has been identified and/or counted by control module 1030, control module 1030 activates high voltage generator 1042 to generate a high voltage to kill insect 1045. In one example, where an insect of interest is identified based upon the sound (i.e., frequency) of its wing beats, when the sound stop (indicating that the insect has landed), control module 1030 activates high voltage generator 1042 to generate a high voltage to kill insect 1045. Killed insects 1046 fall into a collection tray 1048 from where they may be later removed, identified, counted, and/or further analyzed. Advantageously, insects cannot leave landing area 1024 after being identified and counted to return and be identified and counted again.

Although not shown within FIG. 10 for clarity of illustration, system 1000 may include an electrical power source (e.g., a battery, rechargeable battery, etc.). Further, system 1000 may include a solar panel to charge the rechargeable battery when so implemented.

Since system 1000 may be configured to selectively kill insects identified as being of interest, processing of the captured insects in much easier than in the prior art where all insects are captured and then searched to identify the insects of interest. System 1000 may further be configured to notify remote server 960 when one or more insects of interest have been captured. Thus a person doesn't waste a journey to a remote site to collect insects when no insect of interest has been captured.

Figure 11:
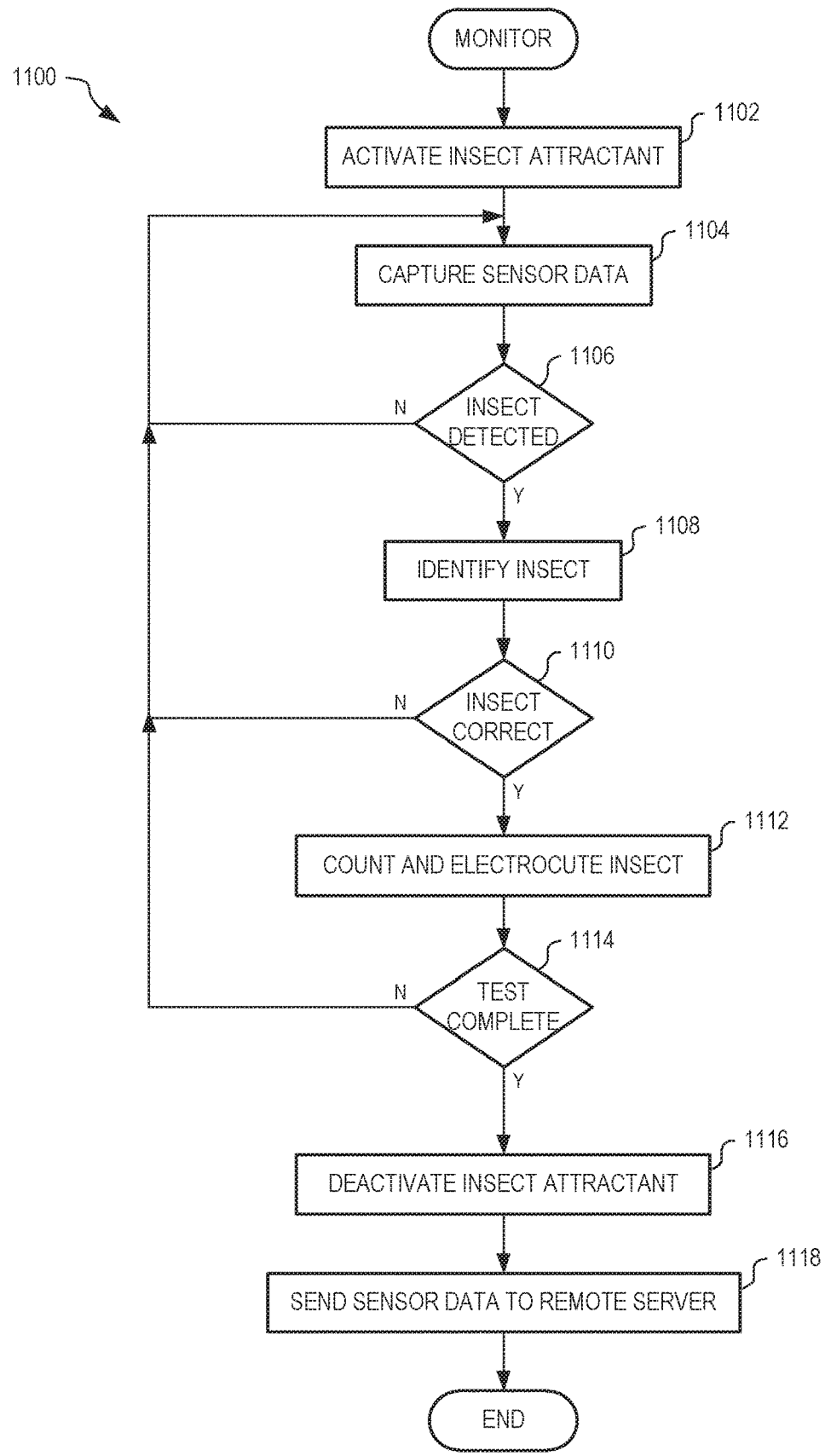
FIG. 11 shows one exemplary method for remotely detecting and electrocuting insects, in an embodiment.

FIG. 11 shows one exemplary method 1100 for remotely detecting and electrocuting insects. Method 1100 is for example implemented within software 1036 of system 1000 of FIG. 10 and is invoked (e.g., by a timer and/or by a wirelessly received command) to identify and/or count insects at a remote location.

In step 1102, method 1100 activates the insect attractant. In one example of step 1102, control module 1030 activates valve 1015 to release attractant 1012 from cartridge 1010 into container 1002. In step 1104, method 1100 captures sensor data. In one example of step 1104, control module 1030 uses sensor 1006 to capture sensor data 1040 that includes images of landing area and audio.

Step 1106 is a decision. If, in step 1106, method 1100 determines that an insect is detected, method 1100 continues with step 1108; otherwise, method 1100 continues with step 1104. In one example of step 1106, control module 1030 analyzes sensor data 1040 to detect an insect within image data and/or audio data.

In step 1108, method 1100 identifies the insect. In one example of step 1108, control module 1030 executes one or more algorithms of software 1036 to process sensor data 1040 and identify (e.g., using image matching and/or audio matching) the insect proximate landing area 1024 as an insect of interest. Where multiple insects are present on or near landing area 1024, one or more of these insects may be identified.

Step 1110 is a decision. If, in step 1110, method 1100 determines that the identified insect is of interest, method 1100 continues with step 1112; otherwise, method 1100 continues with step 1104.

In step 1112, method 1100 counts and electrocutes the insect. In one example of step 1112, control module 1030 increments a count of identified insects within sensor data 1040 and then activates high voltage generator 1042 momentarily to electrocute the identified insect(s) proximate landing area 1024, such that the dead insect(s) 1046 fall into tray 1048.

Step 1114 is a decision. If, in step 1114, method 1100 determines that the test is complete, method continues with step 1116; otherwise, method 1100 continues with step 1004. In one example of step 1114, control module 1030 determines that a testing period is over and continues with step 1116.

In step 1116, method 1100 deactivates the insect attractant. In one example of step 1116, control module 1030 deactivates valve 1015 to stop the flow of insect attractant 1012 from attractant cartridge 1010 to container 1002. In step 1118, method 1100 sends sensor data to a remote server. In one example of step 1118, control module 1030 uses communication module 1038 to send sensor data 1040 wirelessly to a server that is remote from system 1000.

Figure 12:
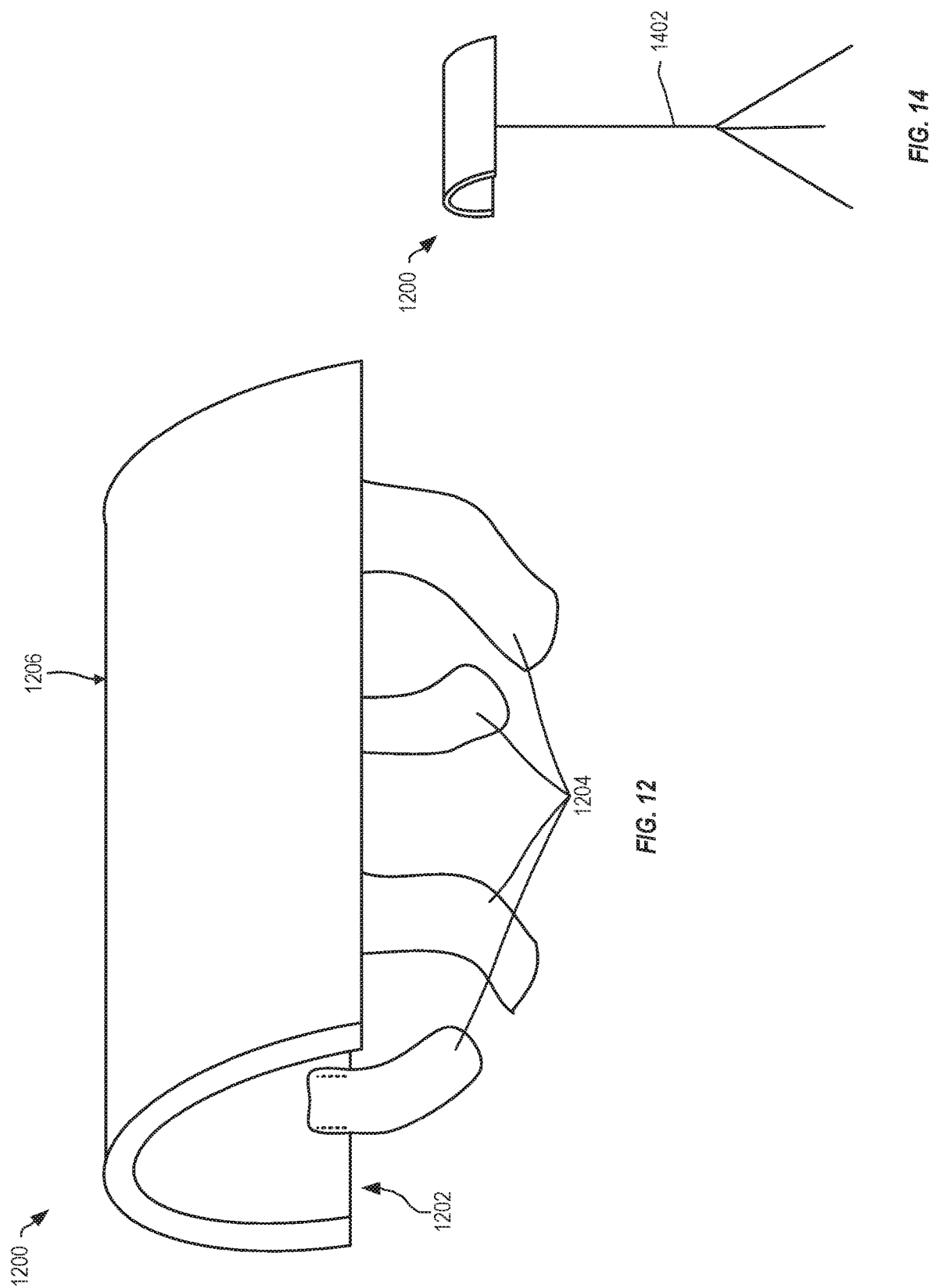
FIG. 12 shows one exemplary arm simulator for counting mosquito landing rates, in an embodiment.
Figure 13:
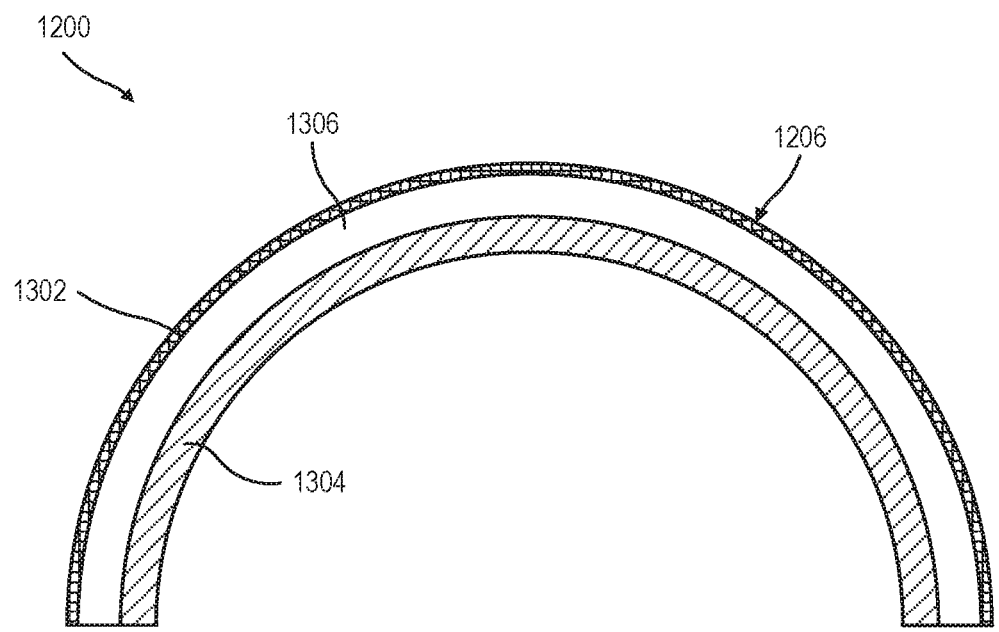
FIG. 13 shows the arm simulator mounted on a stand, in an embodiment.

FIG. 12 shows one exemplary arm simulator 1200 for counting mosquito landing rates. FIG. 13 shows a cross section through the arm simulator of FIG. 12. FIGS. 12 and 13 are best viewed together with the following description.

Arm simulator 1200 is formed of a layered structure 1202 that simulates, as perceived by mosquitoes, a human forearm and has attachment straps 1204 for removably attaching to a person's arm. In one embodiment, attachment straps 1204 are loop and hook type fasteners. In another embodiment, attachment straps 1204 are elasticated loops that slip over a person's arm. Other means for attachment of arm simulator 1200 to a person's arm may be used without departing from the scope hereof.

Layered structure 1202 may be flexible such that it easily conforms to the shape of the person's arm when attached using attachment straps 1204. In certain embodiments, when not attached to the person's arm, layered structure 1202 may be substantially flat, and thereby easily packed and transported. An outer surface 1206 of arm simulator 1200 forms a landing area for mosquitoes such that an observer may count a landing rate of mosquitoes. Arm simulator 1200 may be worn over clothing (e.g., mosquito protective clothing) such that the wearer is not exposed to mosquito bites. Since arm simulator 1200 is perceived by the mosquito as resembling a human forearm, landing area 1206 appears as attractive to the mosquito as a person's forearm. Further, since arm simulator 1200 is attached to a person, gases from, heat given off by, and movement of, the human attract the mosquito. That is, the mosquito is genuinely attracted to a human. However, the person wearing arm simulator 1200 and counting mosquito landings is protected from mosquito bites, since insects landing on landing area 1206 cannot harm the person. Arm simulator 1200 is for example made from one or more of elastomers, epoxy resins, suspensions, gelatinous substances, metals and textiles and may include one or more nano- and micro-fillers. However, arm simulator 1200 may be made from other materials without departing from the scope hereof.

As shown in FIG. 13, arm simulator 1200 is formed of an outer skin 1302 that is formed of a material similar to human (or certain animal) skin and a protective base layer 1304. In certain embodiments, outer skin 1302 may include hair similar to a human forearm. Outer skin 1302 may be permeable to gases but may not be permeable to liquid, may have an outer texture similar to human skin to form landing area 1206, may have a thickness similar to human skin, and is penetrable by the proboscis/mouth parts of a mosquito. Arm simulator 1200 has a middle layer 1306 formed of a liquid or gel that may be similar to blood and may be ingested by the mosquito. Thus, the mosquito penetrating outer skin 1302 may ingest middle layer 1306 and remain on arm simulator 1200 until satiated. Since the mosquito is ingesting fluid, it remains at landing area 1206 for a longer period as compared to the time spent by a mosquito that is not ingesting fluid. This allows for easier and more accurate counting of the mosquito landing rate since for example, the same mosquito is not temporarily landing, departing, and landing again.

In certain embodiment, middle layer 1306 includes one or more insect attractants that slowly permeate through outer skin 1302 into the ambient air around arm simulator 1200 to attract insects to landing area 1206.

Protective base layer 1304 is impenetrable by the proboscis/mouth parts of the mosquito, such that the person wearing arm simulator 1200 is protected from mosquito bites.

FIG. 14 shows arm simulator 1200 mounted on a stand 1402 such that landing area 1206 is easily observed by a person counting the mosquito landing rate thereon. The use of stand 1402 may be less tiring to the person counting the mosquito landing rate as compared to holding out a bare forearm to count landing mosquitoes. The proximity of the person counting the mosquitoes on landing area 1206 also acts as an attractant to the mosquitoes, and thus the accuracy of the mosquito landing rate count is comparable to the conventional method of using a person's bare forearm.

Figure 16:
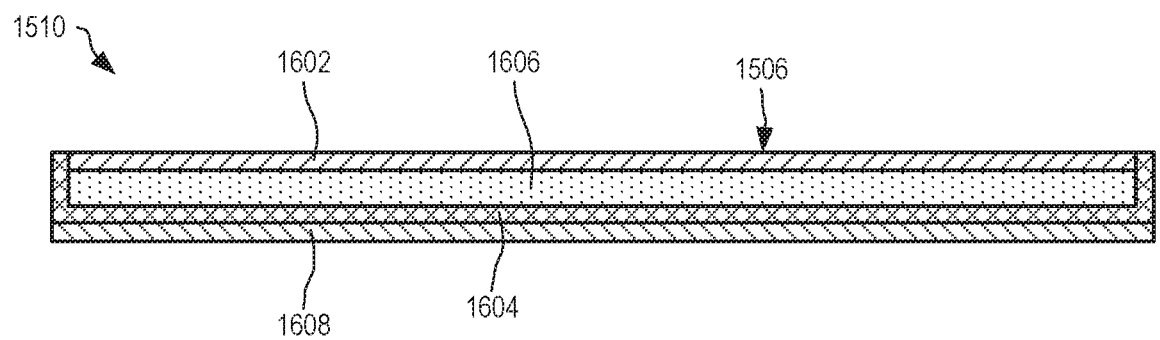
FIG. 16 shows a cross section through the pad of FIG. 15, in an embodiment.
Figure 15:
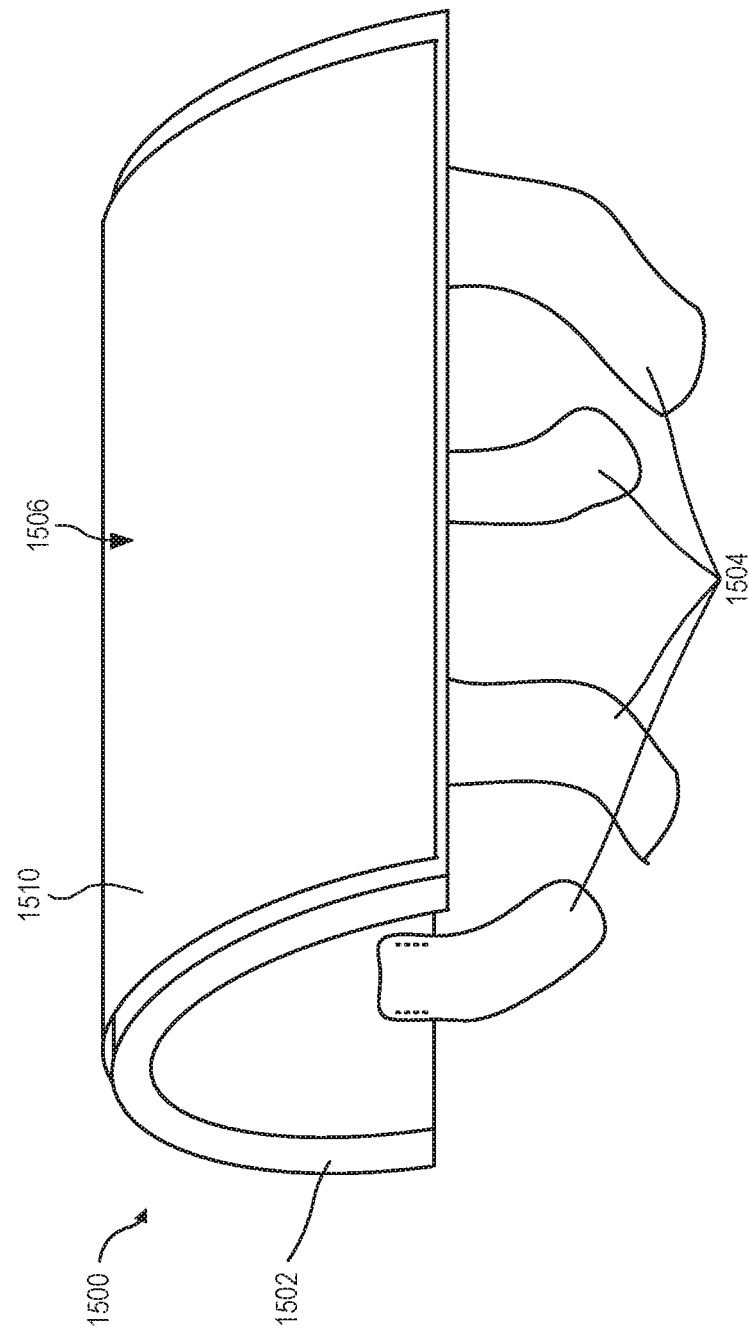
FIG. 15 shows one exemplary arm simulator with replaceable landing pad for counting mosquito landing rates, in an embodiment.

FIG. 15 shows one exemplary arm simulator 1500 with replaceable landing pad 1510 for counting mosquito landing rates. FIG. 16 shows a cross section through replaceable landing pad 1510 of FIG. 15. FIGS. 15 and 16 are best viewed together with the following description.

Arm simulator 1500 is formed of a flexible material 1502 has attachment straps 1504 for removably attaching to a person's arm. In one embodiment, attachment straps 1504 are loop and hook type fasteners. In another embodiment, attachment straps 1504 are elasticated loops that slip over a person's arm. Other means for attachment of arm simulator 1500 to a person's arm may be used without departing from the scope hereof.

Flexible material 1502 easily conforms to the shape of the person's arm when attached using attachment straps 1504. Flexible material 1502 is impenetrable by the proboscis/mouth parts of the mosquito, such that the person wearing arm simulator 1500 is protected from mosquito bites.

Replaceable landing pad 1510 has an outer skin 1602 that is formed of a material similar to human (or certain animal) skin and a protective base layer 1604. Outer skin 1602 is similar to outer skin 1302 of FIG. 13 and may be permeable to gases but may not be permeable to liquid, may have an outer texture similar to human skin to form landing area 1506, may have a thickness similar to human skin, and is penetrable by the proboscis/mouth parts of a mosquito. In certain embodiments, outer skin 1602 may include hair similar to a human forearm. Replaceable landing pad 1510 has a middle layer 1606 formed of a liquid or gel that may be similar to blood and may be ingested by the mosquito. Thus, the mosquito penetrating outer skin 1602 may ingest middle layer 1606 and remain on arm simulator 1500 until satiated. Since the mosquito is ingesting fluid, it remains at landing area 1506 for a longer period as compared to the time spent by a mosquito that is not ingesting fluid. This allows for easier and more accurate counting of the mosquito landing rate since for example, the same mosquito is not temporarily landing, departing, and landing again.

Protective base layer 1604 is impenetrable by the proboscis/mouth parts of the mosquito, such that the person wearing arm simulator 1500 is protected from mosquito bites.

Replaceable landing pad 1510 is similarly sized to flexible material 1502 and may have an adhesive layer 1608 on an outer surface of protective base layer 1604 such that replaceable landing pad 1510 may be removably attached to an outer surface of flexible material 1502. Replaceable landing pad 1510 may be attached to other surfaces, such as clothing, without departing from the scope hereof.

In certain embodiments, middle layer 1606 includes one or more insect attractants that slowly permeate through outer skin 1602 into the ambient air around arm simulator 1500 to attract insects to landing area 1506.

Certain embodiments of the systems and methods described herein may be specifically configured to identify genetic markers of genetically modified insects, thereby allowing the systems and methods described above to monitor the effects of the genetically modified insects released into the environment. Further, by distinguishing between the genetically modified insects and non-genetically modified insects, the systems and methods disclosed herein may monitor the effects of the genetically modified insects on the natural insect population. For example, where genetically modified insects are released into a particular area, the release of the insects effectively skews the regular counts. By distinguishing between genetically modified and non-genetically modified insects, an accurate counts can be generated to give a more accurate representation of insect populations.

Changes may be made in the above methods and systems without departing from the scope hereof. For example, functionality of system 100, 200, 300, 400, 500, 700, 900, and 1000 of FIGS. 1, 2, 3, 4, 5, 7, 9, and 10, respectively, may be combined. Also, although a single count of identified insects is shown, each of the above systems and methods may be configured to identify more than one insect species and/or sub-species and maintain and report individual counts of the identified species and/or sub-species. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which might be said to fall therebetween.

What is claimed is:

1. A remote insect monitor, comprising:
a container including an insect attractant permeable membrane that forms at least a portion of an exterior surface of the container, the permeable membrane forming a landing area and being configured to allow an insect attractant within the container to permeate into ambient air proximate the landing area, wherein the permeable membrane is at least partially translucent;
a light source positioned within the container to transmit light through, and to illuminate, the permeable membrane, wherein the light source is modulated to attract insects;
at least one detection sensor for generating sensor data of insects proximate the landing area;

a trap for trapping at least one of the insects proximate the landing area, comprising an airflow generator and a collection tray;
an actuator for positioning a hose coupled to the airflow generator; and
a control module having a processor and a memory storing machine readable instructions executable by the processor to:
control the light source;
process the sensor data of insects;
count the insects proximate the landing area;
to control the airflow generator to generate airflow to move the at least one insect from proximate the landing area into the collection tray where the at least one insect is trapped; and
to locate one of the insects proximate the landing area and to control the actuator to move the hose closer to the one insect and activate the airflow generator to collect and capture the one insect when identified as being of interest.

2. The remote insect monitor of claim 1, the permeable membrane being gas permeable and impermeable to liquid water.

3. The remote insect monitor of claim 1, further comprising a removable cover disposed over the permeable membrane for preventing permeation of the insect attractant.

4. The remote insect monitor of claim 3, the removable cover being replaceable to stop the permeation of the insect attractant.

5. The remote insect monitor of claim 3, further comprising a motor configured to open and close the removable cover, the control module including instructions stored within the memory and executable by the processor to open and close the removable cover to release a dose of the insect attractant.

6. The remote insect monitor of claim 3, the container comprising a pouch that is inflatable by the insect attractant and releases a dose of the insect attractant into the ambient air proximate the landing area via the permeable membrane.

7. The remote insect monitor of claim 6, the permeable membrane comprising a polydimethylsiloxane membrane.

8. The remote insect monitor of claim 1, further comprising a heater configured with the container, the control module further including machine readable instructions executable by the processor to control the heater to heat the insect attractant within the container to facilitate permeation of the insect attractant through the permeable membrane.

9. The remote insect monitor of claim 1, further comprising an attractant cartridge and a fluid path between the attractant cartridge and the container, the attractant cartridge containing multiple doses of the insect attractant.

10. The remote insect monitor of claim 9, further comprising a valve configured in the fluid path between the attractant cartridge and the container, the control module further including machine readable instructions executable by the processor to control the valve to deliver a dose of the insect attractant from the attractant cartridge to the container.

11. The remote insect monitor of claim 9, further comprising a pump configured in the fluid path between the attractant cartridge and the container, the control module further including machine readable instructions executable by the processor to control the pump to deliver a dose of the insect attractant from the attractant cartridge to the container.

12. The remote insect monitor of claim 1, the insect attractant being selected to attract a particular species of insect.

13. The remote insect monitor of claim 1, the control module further including machine readable instructions executable by the processor to control the light source to emit light at a wavelength that attracts a particular species of insect.

14. The remote insect monitor of claim 1, further comprising:
a rechargeable battery for providing electrical power to the processor and the memory; and
a solar panel for recharging the rechargeable battery.

15. The remote insect monitor of claim 1, further comprising a communication module for communicating with a remote server, the control module further including machine readable instructions executable by the processor to operate the communication module to receive configuration parameters from the remote server and to send the sensor data to the remote server.

16. The remote insect monitor of claim 15, the control module further including machine readable instructions executable by the processor to control the communication module to communicate with other remote insect monitors to form a communication network.

17. The remote insect monitor of claim 1, wherein the light source further comprises multiple lights.

18. A method for remotely detecting and trapping insects, comprising:
releasing an insect attractant from a container through an at least partially translucent permeable membrane that forms at least a portion of an exterior surface of the container and a landing area that is exposed to ambient air, a tray proximate the landing area, and an airflow generator and a hose coupled to the airflow generator;
modulating a light source positioned within the container to transmit light through, and to illuminate, the at least partially translucent permeable membrane to attract insects;
capturing, from a sensor proximate the landing area, sensor data of insects proximate the landing area;
processing the sensor data to count the insects proximate the landing area;
sending the count to a remote server;
generating airflow to move the insects from the landing area to the tray where the insects are trapped;
controlling the hose with an actuator to move closer to at least one insect; and
generating airflow through the hose to collect and capture the at least one insect when identified as being of interest.

* * * * *